(12) United States Patent
Xiang et al.

(10) Patent No.: US 7,550,963 B1
(45) Date of Patent: Jun. 23, 2009

(54) ANALYTICAL SCANNING EVANESCENT MICROWAVE MICROSCOPE AND CONTROL STAGE

(75) Inventors: Xiao-Dong Xiang, Danville, CA (US); Chen Gao, Anhui (CN); Fred Duewer, Albany, CA (US); Hai Tao Yang, Albany, CA (US); Yalin Lu, Chelmsford, MA (US)

(73) Assignee: The Regents of the University of California, Oakland, CA (US)

( * ) Notice: Subject to any disclaimer, the term of this patent is extended or adjusted under 35 U.S.C. 154(b) by 322 days.

(21) Appl. No.: 09/608,311

(22) Filed: Jun. 30, 2000

Related U.S. Application Data

(63) Continuation-in-part of application No. 09/158,037, filed on Sep. 22, 1998, now Pat. No. 6,173,604, which is a continuation-in-part of application No. 08/717,321, filed on Sep. 20, 1996, now Pat. No. 5,821,410.

(60) Provisional application No. 60/141,698, filed on Jun. 30, 1999, provisional application No. 60/059,471, filed on Sep. 22, 1997.

(51) Int. Cl.
*G01R 27/00* (2006.01)
(52) U.S. Cl. ................... 324/158.1; 324/635
(58) Field of Classification Search ................ 324/631, 324/637, 635, 301, 636, 316; 73/105; 250/201.3
See application file for complete search history.

(56) References Cited

U.S. PATENT DOCUMENTS

| | | | | |
|---|---|---|---|---|
| 3,774,717 A | * | 11/1973 | Chodorow | 73/61.75 |
| 3,885,239 A | * | 5/1975 | Zaleski | 342/6 |
| 4,364,008 A | * | 12/1982 | Jacques | 324/636 |
| 4,947,034 A | * | 8/1990 | Wickramasinghe et al. | 250/216 |
| 5,039,947 A | * | 8/1991 | Kraszewski et al. | 324/634 |

(Continued)

FOREIGN PATENT DOCUMENTS

TW 117656 11/2000

(Continued)

OTHER PUBLICATIONS

"The Mechanical, Histological, and Ultrasonic Analysis of a Commercially Pure Titanium Surface as a Bone Implant Material" by Matthew et al. Aug. 1995.*

(Continued)

*Primary Examiner*—Paresh Patel
(74) *Attorney, Agent, or Firm*—Fliesler Meyer LLP

(57) ABSTRACT

A scanning evanescent microwave microscope (SEMM) that uses near-field evanescent electromagnetic waves to probe sample properties is disclosed. The SEMM is capable of high resolution imaging and quantitative measurements of the electrical properties of the sample. The SEMM has the ability to map dielectric constant, loss tangent, conductivity, electrical impedance, and other electrical parameters of materials. Such properties are then used to provide distance control over a wide range, from to microns to nanometers, over dielectric and conductive samples for a scanned evanescent microwave probe, which enable quantitative non-contact and submicron spatial resolution topographic and electrical impedance profiling of dielectric, nonlinear dielectric and conductive materials. The invention also allows quantitative estimation of microwave impedance using signals obtained by the scanned evanescent microwave probe and quasistatic approximation modeling. The SEMM can be used to measure electrical properties of both dielectric and electrically conducting materials.

39 Claims, 21 Drawing Sheets

U.S. PATENT DOCUMENTS

| | | | |
|---|---|---|---|
| 5,096,551 A * | 3/1992 | Schoen et al. | 205/688 |
| 5,148,437 A * | 9/1992 | Ohtsu | 372/32 |
| 5,168,538 A * | 12/1992 | Gillespie | 385/123 |
| 5,233,306 A * | 8/1993 | Misra | 324/601 |
| 5,554,935 A * | 9/1996 | Kraszewski et al. | 324/637 |
| 5,559,328 A | 9/1996 | Weiss et al. | 250/306 |
| 5,585,722 A * | 12/1996 | Hosoki et al. | 324/318 |
| 5,619,035 A | 4/1997 | Weiss et al. | 250/306 |
| 5,821,410 A | 10/1998 | Xiang et al. | 73/105 |
| 5,900,618 A | 5/1999 | Anlage et al. | 250/201.3 |
| 6,173,604 B1 | 1/2001 | Xiang et al. | 73/105 |

FOREIGN PATENT DOCUMENTS

| | | |
|---|---|---|
| WO | WO 99/16102 | 4/1999 |

OTHER PUBLICATIONS

"Scanning Probe Microscopy" by Bottomley et al. (American Chemical Society), Analytical Chemistry, vol. 68, No. 12, Jun. 15, 1996 (pp. 815R to 230R).*

"Controlling and tuning strong optical field gradients at a local probe microscope tip apex" by Martin et al. American Institute of Physics [S0003-6951(97)03206-3] Feb. 10, 1997.*

"Facts and artifacts in near-field optical microscopy" by Hecht et al. American Institute of Physics [S0021-8979(97)00305-8] Mar. 15, 1997.*

"Sub-wavelength patterning of the optical near-field" by Quidant et al. OSA, Jan. 26, 2004/vol. 12.*

"Apertureless near-field optical microscope" by Wickramasinghe et al. Applied Physics Letters (ISSN 0003-6951), vol. 65, No. 13, p. 1623-1625, Sep. 1994.*

"A microwave scanning surface harmonic microscope using a re-entrant resonant cavity" by Bordoni et al. Meas. Sci. Technol. 6 (1995) pp. 1208-1214.*

"Near-field Microwave Microscopy of Material Properties" by Anlage et al. University of Maryland, Apr. 2000.*

"An S-Band Test Cavity for a Field Emission Based RF-Gun" by T. Weiss et al. Germany. pp. 1471-1473.*

"Scanning probe microscopy for 2-D semiconductor dopant profiling and device failure analysis" by Henning et al. Thayer School of Engineering, NH, USA.*

"Heterodyne Electrostatic Force Microscopy used as a New Non-contact test technique for Integrated Circuits" by Said et al. University of Manitoba, Canada. IEEE 1995.*

"Use of time domain spectroscopy for measuring dielectric properties with a coaxial probe," by Gabriel et al. 1986.*

"Microwave Resonant Cavities for Sending Moisture and Mass of Single Seeds and Kernels," by Kraszewski et al. 1992).*

"Dielectric Probe for Permittivity and Permiability Measurements at Low Microwave Frequencies" by Derray et al. 1992.*

"A Quasi-Static Analysis of Open-Ended Coaxial Lines" by Misra 1987.*

Bryant, C.A., et al., "Noncontact Technique for the Local Measurement of Semiconductor Resisitivity," The Review of Scientific Instruments, vol. 36, No. 11, Nov. 1965, pp. 1614-1617.

Ash, E.A., et al., "Super-Resolution Aperture Scanning Microscope," Nature, vol. 237, Jun. 30, 1972, pp. 510-512.

Gutmann, Ronald J., et al., "Microwave Scanning Microscopy for Planar Structure Diagnostics," IEEE MTT-S Digest, 1987, pp. 281-284.

Fee, M., et al., "Scanning Electromagnetic Transmission Line Microscope With Sub-Wavelength Resolution," Optics Communication, vol. 69, No. 3 & 4, Jan. 1, 1989, pp. 219-224.

Xiang, X.-D., et al., Use of a Helical Resonator as a Capacitive Transducer in Vibrating Reed Measurements, Rev. Sci. Instrument, vol. 60, No. 9, Sep. 1989, pp. 3035-3040.

Pozar, David M., "Microwave Engineering," 1990, Addison-Wesley Publishing Company, Reading, Massachusetts, Chapter 7.1, Microwave Resonators, pp. 336-347, Chapter 7.8, CAvity Perturbations, pp. 371-373.

Tabib-Azar, Massood, et al., "Non-Destructive Characterization of Materials by Evanescent Microwaves," Measuring Science Technology, vol. 4, 1993, pp. 583-590.

Vlahacos, C.P., et al., "Near-Field Scanning Microwave Microscope With 100 Micron Resolution," Applied Physics Letters, vol. 69, No. 21, Nov. 18, 1996, pp. 3272-3274.

Lu, Yalin, et al., "Nondestructive Imaging of Dielectric-Constant Profiles and Ferroelectric Domains With a Scanning-Tip Microwave Near-Field Microscope," Science, vol. 276, Jun. 27, 1997, pp. 2004-2006.

Gao, Chen, et al., "High Spatial Resolution Quantitative Microwave Impedance Microscopy by a Scanning Tip Microwave Near-Field Microscope," Applied Physics Letters, vol. 71, No. 12, Sep. 29, 1997, pp. 1872-1874.

Wei, T., et al., "Scanning Tip Microwave Near-Field Microscope," Applied Physics Letters, vol. 68, No. 24, Jun. 10, 1996, pp. 1-3.

Gao, Chen, et al., "Quantitative Nonlinear Dielectric Microscopy of Periodically Polarzed Ferroelectric Domains," Applied Physics Letters, vol. 73, No. 8, Aug. 24, 1998, pp. 1146-1148.

Gao, Chen, Xiang, X.-D., "Quantitative Microwave Near-Field Microscopy of Dieclectric Properties," Review of Scientific Instruments, vol. 69, No. 11, Nov. 1998, pp. 3846-3851.

Duewer, Fred, et al., "Tip-Sample Distance Feedback Control in a Scanning Evanescent Microwave Microscope," Applied Physics Letters, vol. 74, No. 18, May 3, 1999, pp. 2696-2698.

Gao, Chen, et al., "Quantitative Microwave Evanescent Microscopy," Applied Physics Letters, vol. 75, No. 19, Nov. 8, 1999, pp. 3005-3007, with Errata published in Applied Physics Letters. vol. 76, No. 5, Jan. 31, 2000, pp. 656.

* cited by examiner

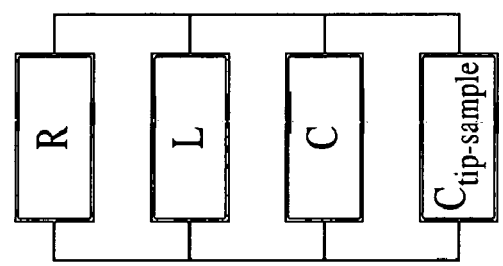
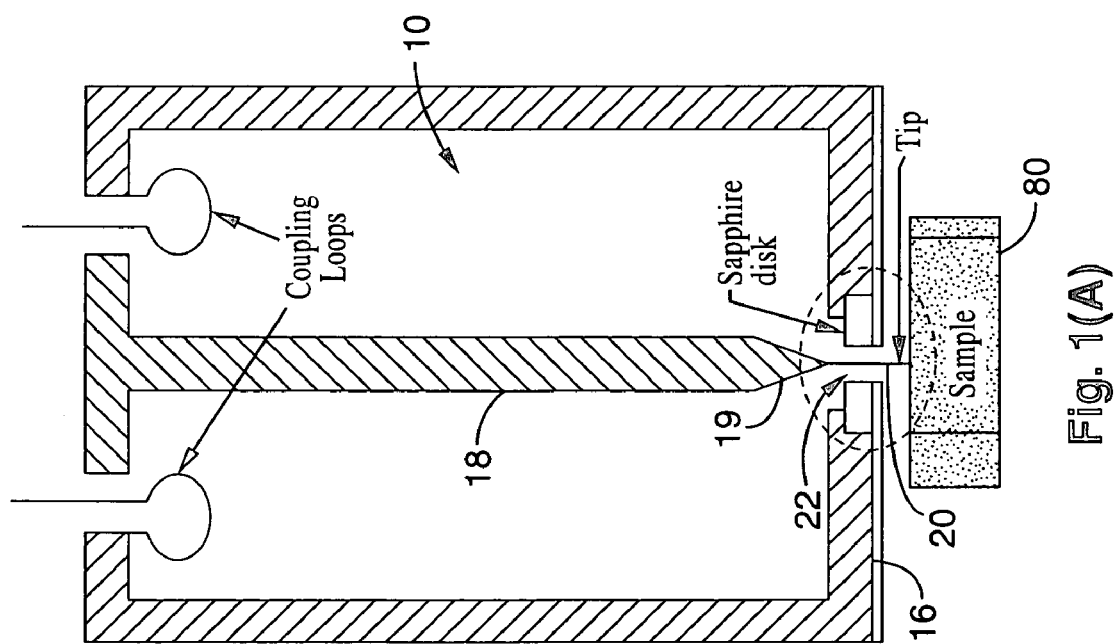

Calculation

Since $\lambda \gg R_0 \sqrt{|\varepsilon|}$

The field distribution is approximately quasi-static and can be calculated by the method of images.

ANALYTICAL SCANNING EVANESCENT MICROWAVE MICROSCOPE AND CONTROL STAGE

CROSS-REFERENCE TO RELATED APPLICATIONS

This application claims the benefit of prior provisional application Ser. No. 60/141,698, filed on Jun. 30, 1999 and provisional application Ser. No. 60/059,471, filed on Sep. 22, 1997. This application is a continuation in-part of application Ser. No. 09/158,037 filed on Sep. 22, 1998, now U.S. Pat. No. 6,173,604, which is a continuation-in-part of application Ser. No. 08/717,321 filed on Sep. 20, 1996, now U.S. Pat. No. 5,821,410.

STATEMENT REGARDING FEDERALLY SPONSORED RESEARCH OR DEVELOPMENT

This invention was made with U.S. Government support under Contract No. DE-AC03-76SF00098 between the U.S. Department of Energy and the University of California for the operation of Lawrence Berkeley Laboratory. The U.S. Government may have certain rights in this invention.

INCORPORATION-BY-REFERENCE OF MATERIAL SUBMITTED ON A COMPACT DISC

Not Applicable

BACKGROUND OF THE INVENTION

1. Field of the Invention

This invention relates generally to scanning probe microscopy and more specifically to scanning evanescent electromagnetic wave microscopy and/or spectroscopy.

2. Description of Related Art

Quantitative dielectric measurements are currently performed by using deposited electrodes on large length scales (mm) or with a resonant cavity to measure the average dielectric constant of the specimen being tested. Quantitative conductivity measurements of the test specimen can only be accurately performed with a four-point probe. A drawback associated with performing the aforementioned measurements is that the probe tip used to measure the dielectric and conductivity properties of the test specimen often comes into contact with the test specimen. Repeated contact between the probe tip and the test specimen causes damage to both the probe tip and the specimen, thereby making the resulting test measurements unreliable.

Another drawback associated with the aforementioned measurements is that gap distance between the probe tip and the test specimen can only be accurately controlled over a milli-meter (mm) distance range.

BRIEF SUMMARY OF THE INVENTION

The present invention allows quantitative non-contact and high-resolution measurements of the complex dielectric constant and conductivity at RF or microwave frequencies. The present invention comprises methods of tip-sample distance control over dielectric and conductive samples for the scanned evanescent microwave probe, which enable quantitative non-contact and high-resolution topographic and electrical impedance profiling of dielectric, nonlinear dielectric and conductive materials. Procedures for the regulation of the tip-sample separation in the scanned evanescent microwave probe for dielectric and conducting materials are also provided.

The present invention also provides methods for quantitative estimation of microwave impedance using signals obtained by scanned evanescent microwave probe and quasi-static approximation modeling. The application of various quasistatic calculations to the quantitative measurement of the dielectric constant, nonlinear dielectric constant, and conductivity using the signal from a scanned evanescent microwave probe are provided. Calibration of the electronic system to allow quantitative measurements, and the determination of physical parameters from the microwave signal is also provided.

The present invention also provides methods of fast data acquisition of resonant frequency and quality factor of a resonator; more specifically, the microwave resonator in a scanned evanescent microwave probe.

A piezoelectric stepper for providing coarse control of the tip-sample separation in a scanned evanescent microwave probe with nanometer step size and centimeter travel distances is disclosed.

BRIEF DESCRIPTION OF THE SEVERAL VIEWS OF THE DRAWING(S)

FIGS. 1(A)-1(B) are schematic views of equivalent circuits used for modeling the tip-sample interaction;

Figure 14:
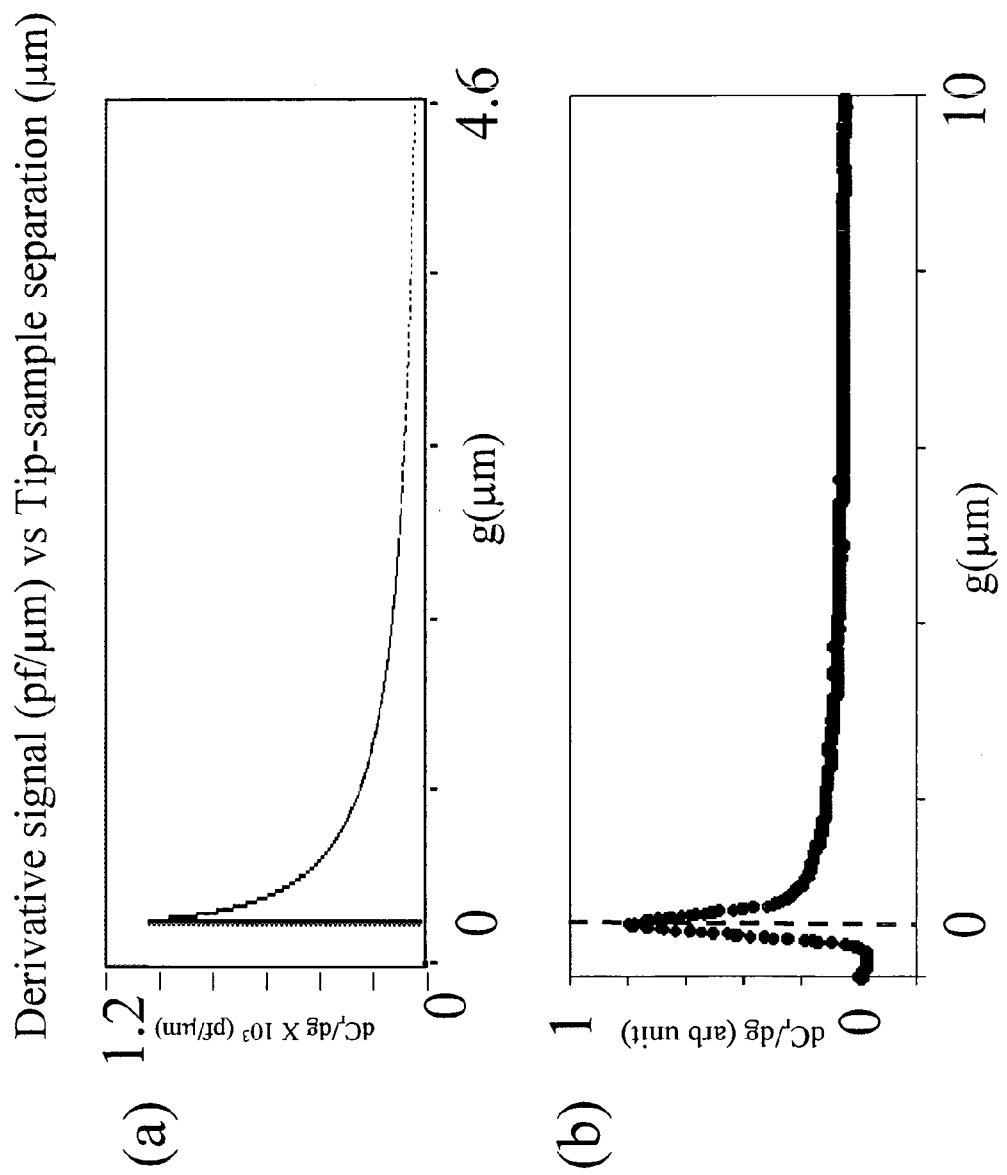
Figure 15:
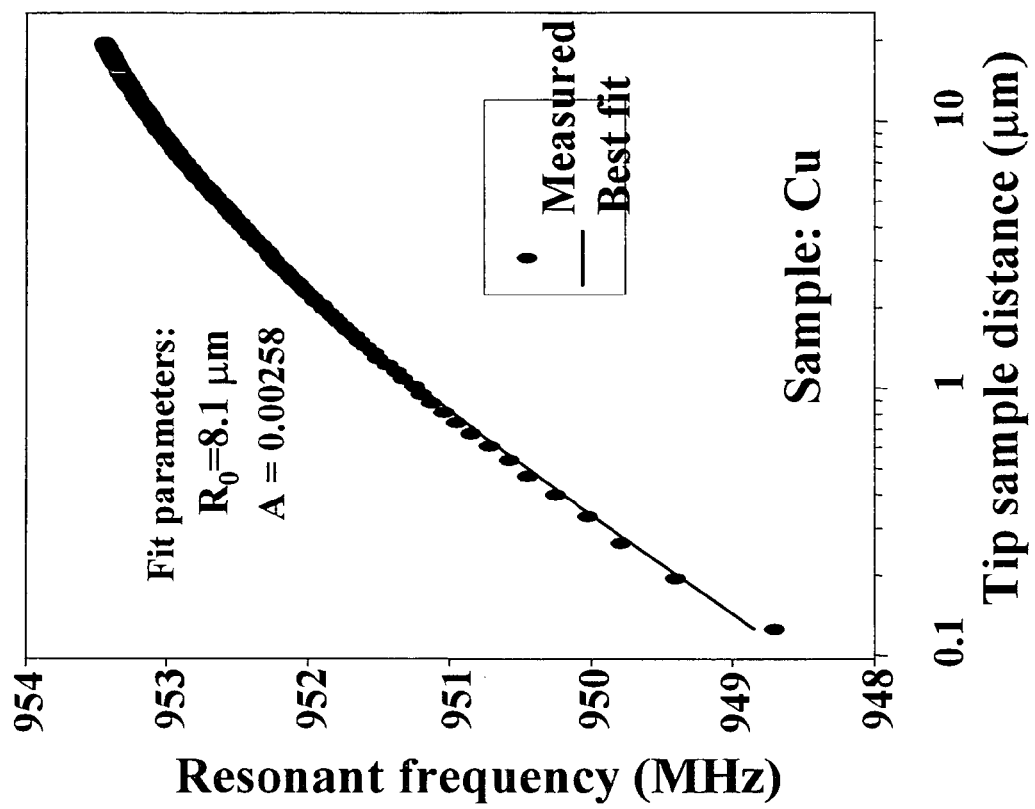
Figure 16:
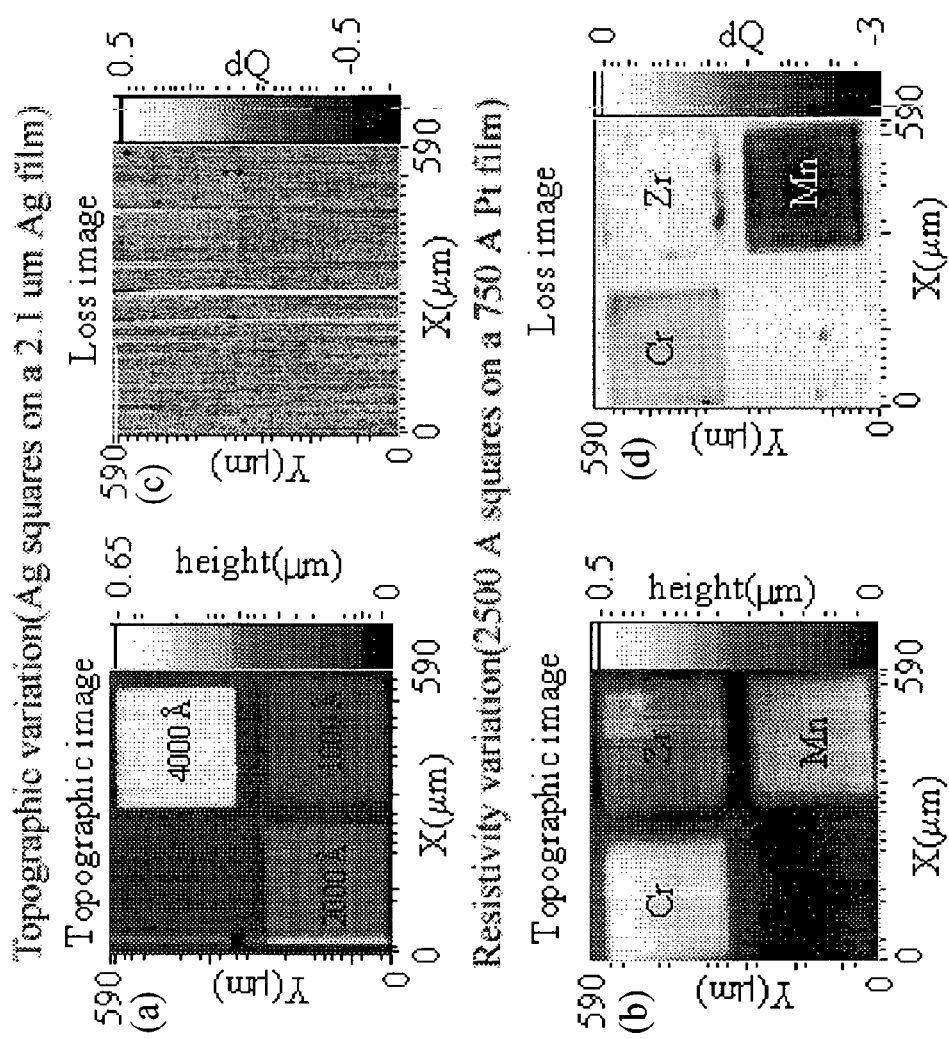
Figure 17:
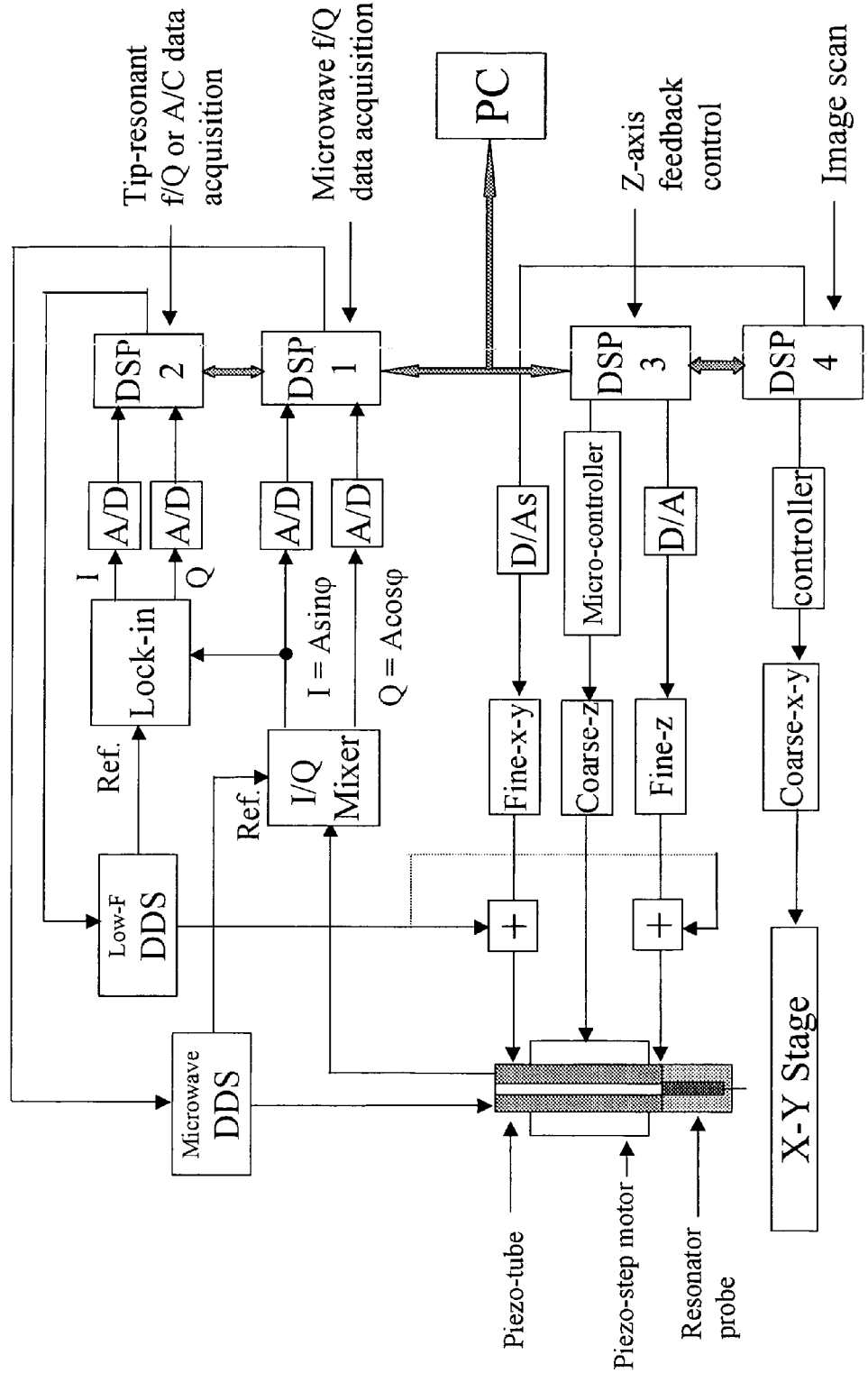
Figure 18:
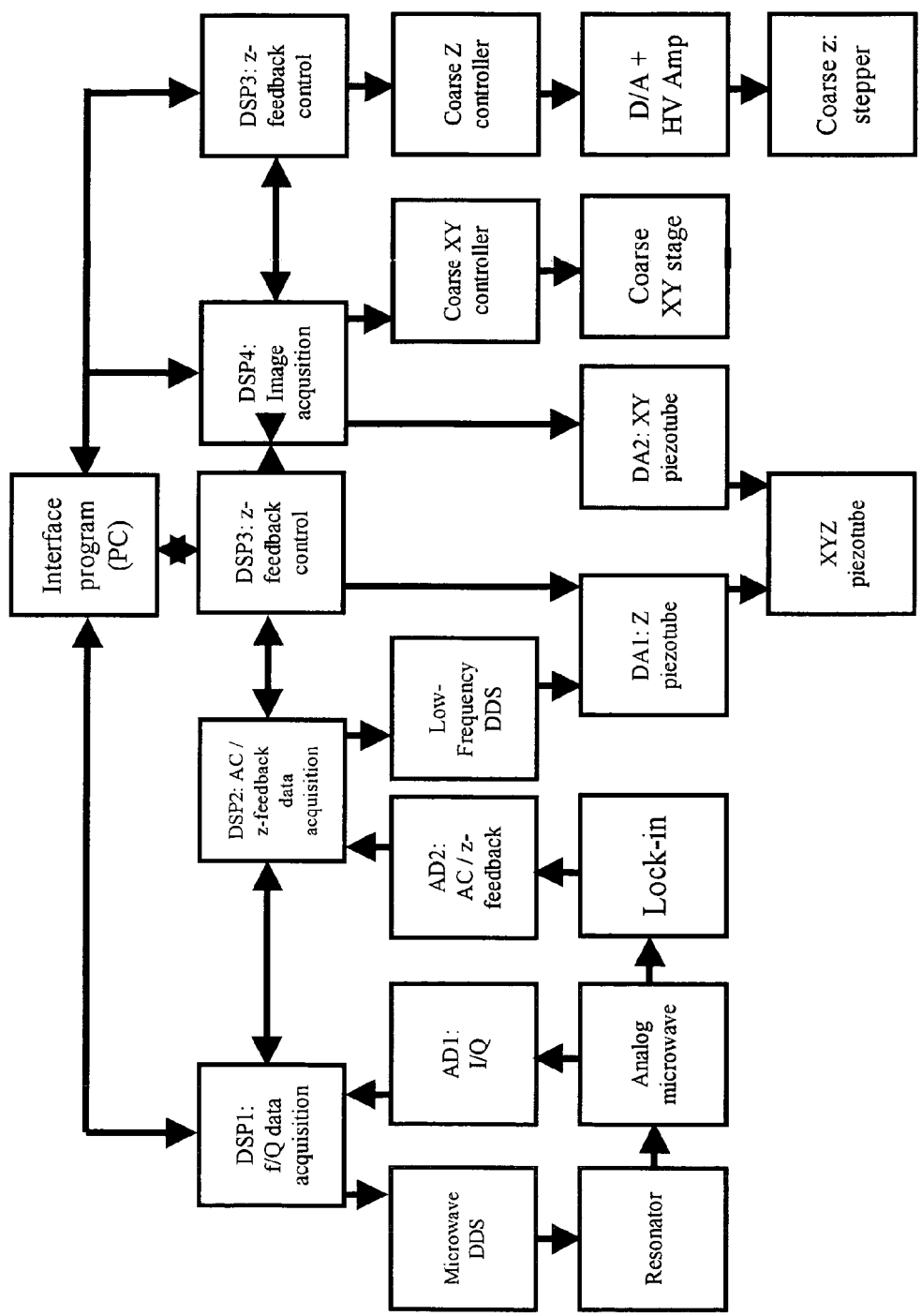
Figure 19:
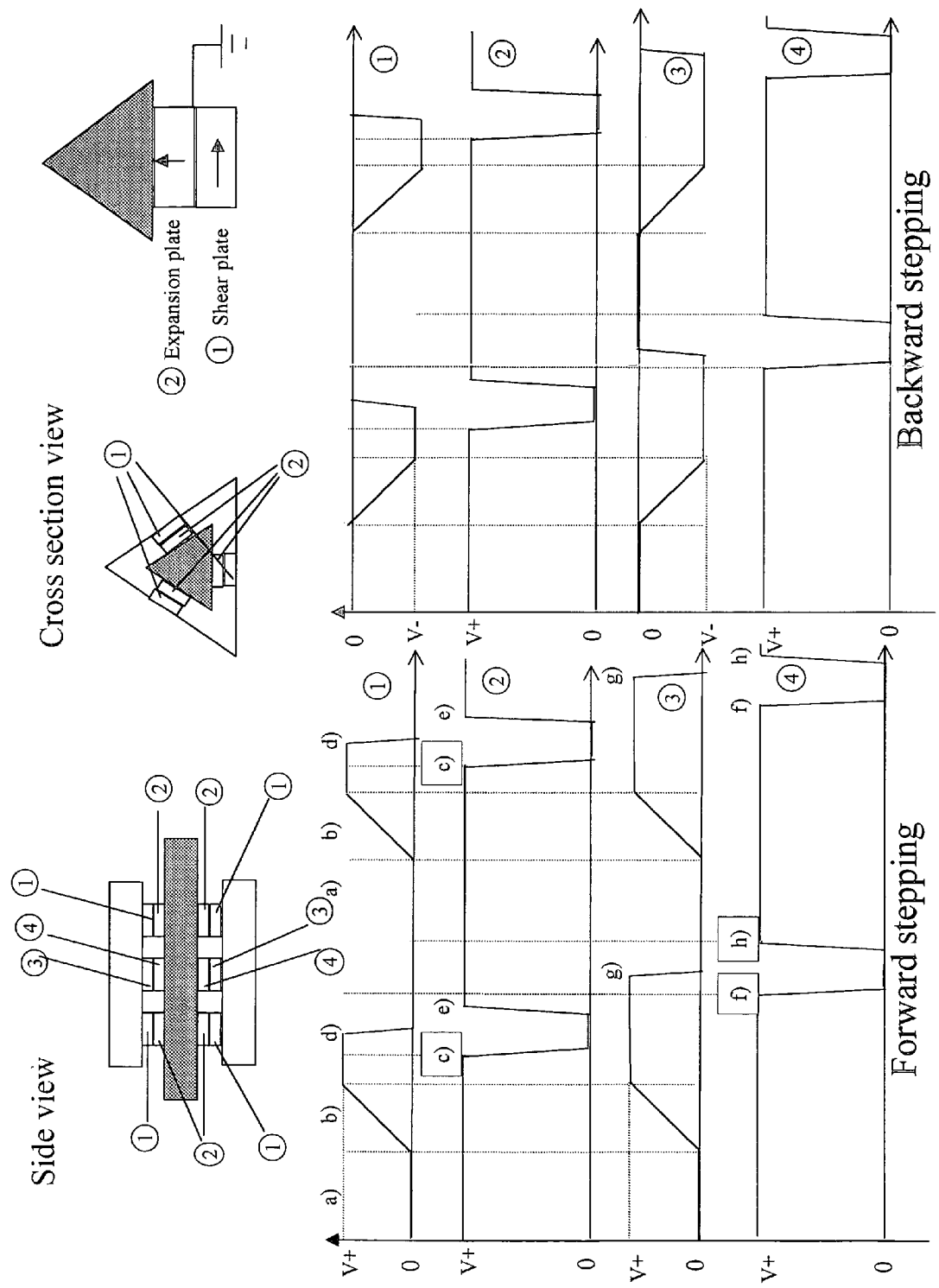
Figure 20:
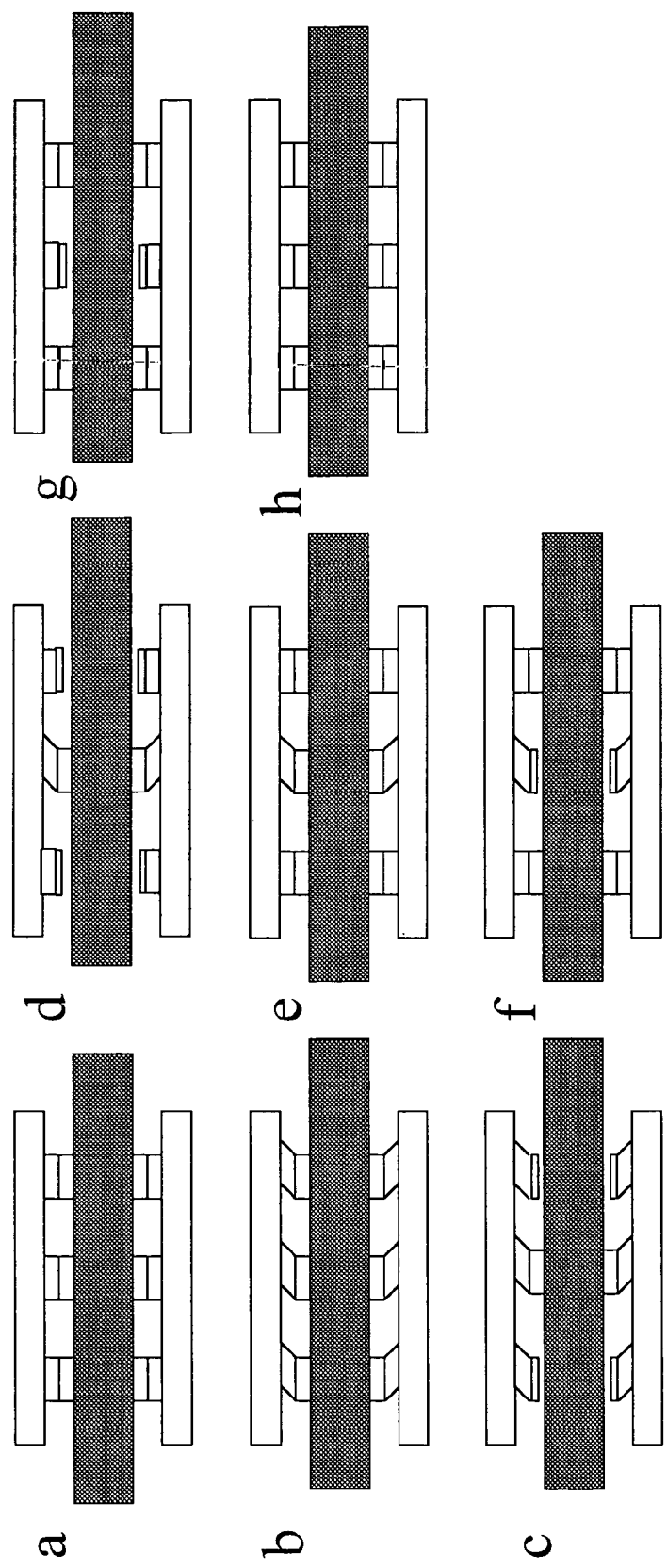
Figure 2L:
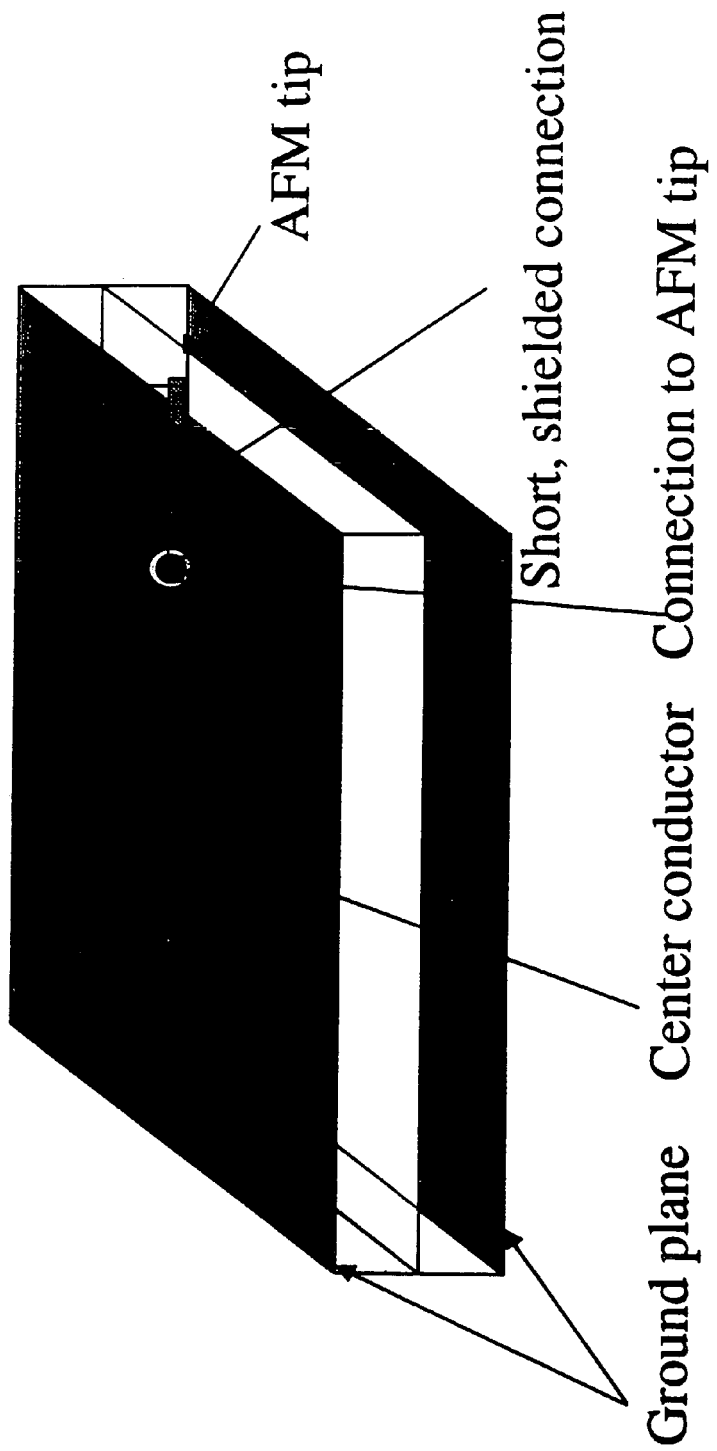

FIG. 14(a)-14(b) are two graphs showing the variation of the derivative signal versus tip-sample variation;

FIG. 15 is a graph showing calibration for regulation of tip-sample separation;

FIG. 16 illustrates the measurement of topographic and resistivity variations;

FIG. 17 is a schematic view of the architecture of the data acquisition and control electronics;

FIG. 18 is a flow chart for of the architecture of the inventive data acquisition and control electronics;

FIG. 19 illustrates the design and operation of the piezoelectric stepper;

FIG. 20 illustrates the sequence of motion of the piezoelectric stepper;

FIG. 21 illustrates the integration of an AFM tip with SEMM.

DETAILED DESCRIPTION OF THE INVENTION

Embodiment A

To determine quantitatively the physical properties, such as the complex dielectric constant, nonlinear dielectric constant and conductivity, through measurements of changes in resonant frequency ($f_r$) and quality factor (Q) as function of different materials, bias electric and magnetic fields, tip-sample distance and temperature, etc. by a scanned evanescent microwave probe (SEMP), a quantitative model of the electric and magnetic fields in the tip-sample interaction region is necessary. A number of quasistatic models can be applied to the calculation of the probe response to dielectric, nonlinear dielectric and conductive materials. For the present invention, these models are applied to the calculation of the complex dielectric constant, nonlinear dielectric constant, and conductivity.

To determine the electrical properties of a sample, the variation in resonant frequency ($f_r$) and quality factor (Q) of a resonant cavity is measured. (FIG. 1(A)). The tip-sample interaction is modeled using the equivalent RLC circuit shown in FIG. 1(B). FIG. 1(A) shows the novel evanescent probe structure comprising a microwave resonator such as illustrated microwave cavity 10 with coupling loops for signal input and output. The sharpened metal tip 20, which, in accordance with the invention acts as a point-like evanescent field emitter as well as a detector, extends through a cylindrical opening or aperture 22 in endwall 16 of cavity 10. Mounted immediately adjacent sharpened tip 20 is a sample 80. Cavity 10 comprises a standard quarter or half wave cylindrical microwave cavity resonator having a central metal conductor 18 with a tapered end 19 to which is attached sharpened metal tip or probe 20. The tip-sample interaction appears as an equivalent complex tip-sample capacitance ($C_{tip-sample}$). Given $f_r$ and Q, the complex tip-sample capacitance can be extracted.

$$\frac{\Delta f}{f_0} = -\frac{C_r}{2C} \tag{1}$$

$$\Delta\left(\frac{1}{Q}\right) = -\left(\frac{1}{Q_0} + \frac{2C_i}{C_r}\right)\frac{\Delta f}{f_0} \tag{2}$$

where $$C_{tip-sample} = C_r + iC_I, \Delta f = f_r - f_0, \Delta\left(\frac{1}{Q}\right) = \frac{1}{Q} - \frac{1}{Q_0},$$

and $f_0$ and $Q_0$ are the unloaded resonant frequency and quality factor. The calculation of $C_{tip-sample}$ is described in greater detail below.

a) Modeling of the Cavity Response for Dielectric Materials

Figure 2:
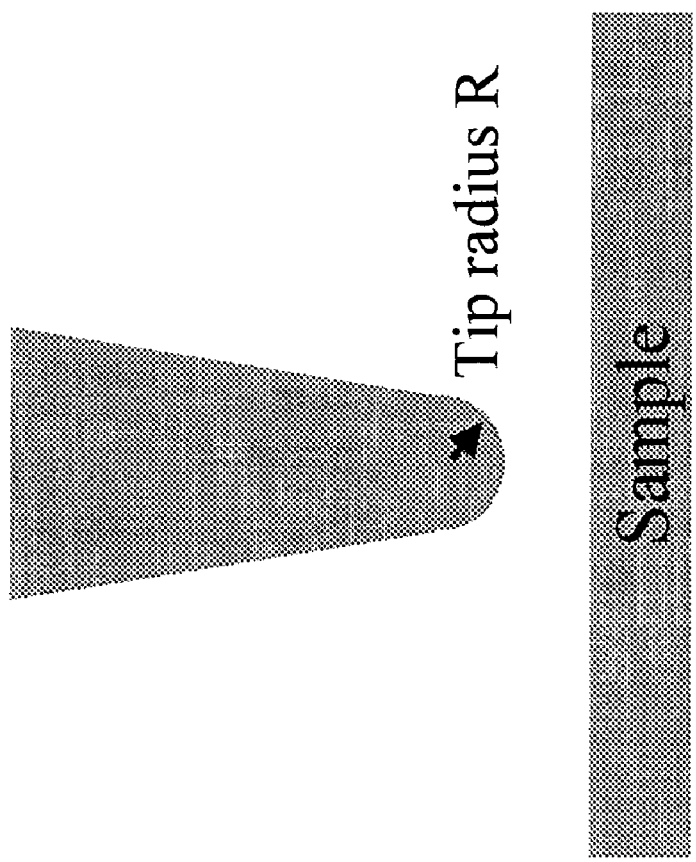
FIG. 2 is a schematic view of the tip-sample geometry.

To allow the quantitative calculation of the cavity response to a sample with a certain dielectric constant, a detailed knowledge of the electric and magnetic fields in the probe region is necessary. FIG. 2 describes the tip-sample geometry. The most general approach is to apply an exact finite element calculation of the electric and magnetic fields for a time-varying three dimensional region. This is difficult and time consuming, particularly for the tip-sample geometry described in FIG. 2. Since the tip is sharply curved, a sharply varying mesh size should be implemented. Since the spatial extent of the region of the sample-tip interaction is much less than the wavelength of the microwave radiation used to probe the sample ($\lambda\sim28$ cm at 1 GHz, ~14 cm at 2 GHz), the quasistatic approximation can be used, i.e. the wave nature of the electric and magnetic fields can be ignored. This allows the relatively easy solution of the electric fields inside the dielectric sample. A finite element calculation of the electric and magnetic fields under quasistatic approximation for the given tip-sample geometry can be applied. A number of other approaches can be employed for the determination of the cavity response with an analytic solution, which are much more convenient to use. The calculation of the relation between complex dielectric constant and SEMP signals for bulk and thin film dielectric materials by means of an image charge approach is now outlined.

Spherical Tip i. Calculation of the Complex Dielectric Constant for Bulk Materials.

The complex dielectric constant measured can be determined by an image charge approach if signals from the SEMP are obtained. By modeling the redistribution of charge when the sample is brought into the proximity of the sample, the complex impedance of the sample for a given tip-sample geometry can be determined with measured cavity response (described below). A preferred model is one that can have an analytic expression for the solution and is easily calibrated and yields quantitatively accurate results. Since the tip geometry will vary appreciably between different tips, a model with an adjustable parameter describing the tip is required. Since the region close to the tip predominately determines the sample response, the tip as a metal sphere of radius $R_0$ can be modeled.

Figure 3:
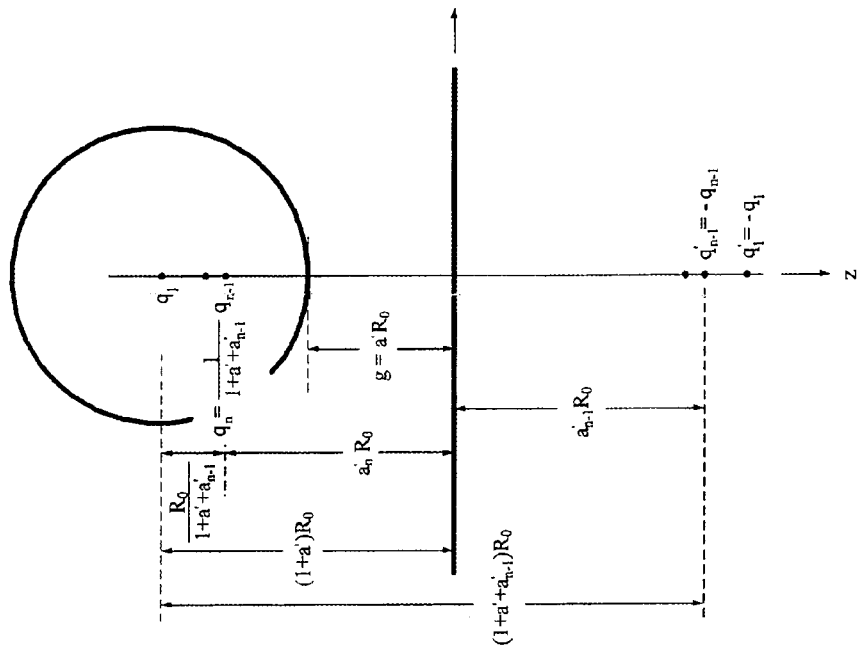
FIG. 3 illustrates the infinite series of image charges used to determine the tip-sample impedance.

FIG. 3 illustrates the infinite series of image charges used to determine the tip-sample impedance. For dielectric samples, the dielectric constant is largely real $$\frac{\varepsilon_i}{\varepsilon_r} < 0.1$$

where $\in_r$ and $\in_i$ are the real and imaginary part of the dielectric constant of the sample, respectively. Therefore, the real portion of the tip-sample capacitance, $C_r$, can be calculated directly and the imaginary portion of the tip-sample capacitance, $C_i$, can be calculated by simple perturbation theory.

Using the method of images, the tip-sample capacitance is calculated by the following equation:

$$C_r = 4\pi\varepsilon_0 R_0 \sum_{n=1}^{\infty} \frac{bt_n}{a_1 + a_n}, \tag{3}$$

where $t_n$ and $a_n$, have the following iterative relationships:

$$a_n = 1 + a' - \frac{1}{1 + a' + a_{n-1}} \text{ and} \quad (4)$$

$$t_n = \frac{bt_{n-1}}{1 + a' + a_{n-1}} \quad (5)$$

with $$a_1 = 1 + a', t_1 = 1, b = \frac{\varepsilon - \varepsilon_0}{\varepsilon + \varepsilon_0}, \text{ and } a' = \frac{d}{R},$$

where $\varepsilon$ is the dielectric constant of the sample, $\varepsilon_0$ is the permittivity of free space, d is the tip-sample separation, and R is the tip radius.

This simplifies to:

$$C_r = 4\pi\varepsilon_0 R_0 \left[ \frac{\ln(1-b)}{b} + 1 \right] \quad (6)$$

as the tip-sample gap approaches zero.

Since the dielectric constant of dielectric materials is primarily real, the loss tangent (tan δ) of dielectric materials can be determined by perturbation theory. The imaginary portion of the tip-sample capacitance will be given by:

$$C_i = C_r \tan \delta. \quad (7)$$

Given the instrument response, $C_{tip\text{-}sample}$, the complex tip-sample capacitance, and therefore the complex dielectric constant of the sample can be estimated.

Figure 4:
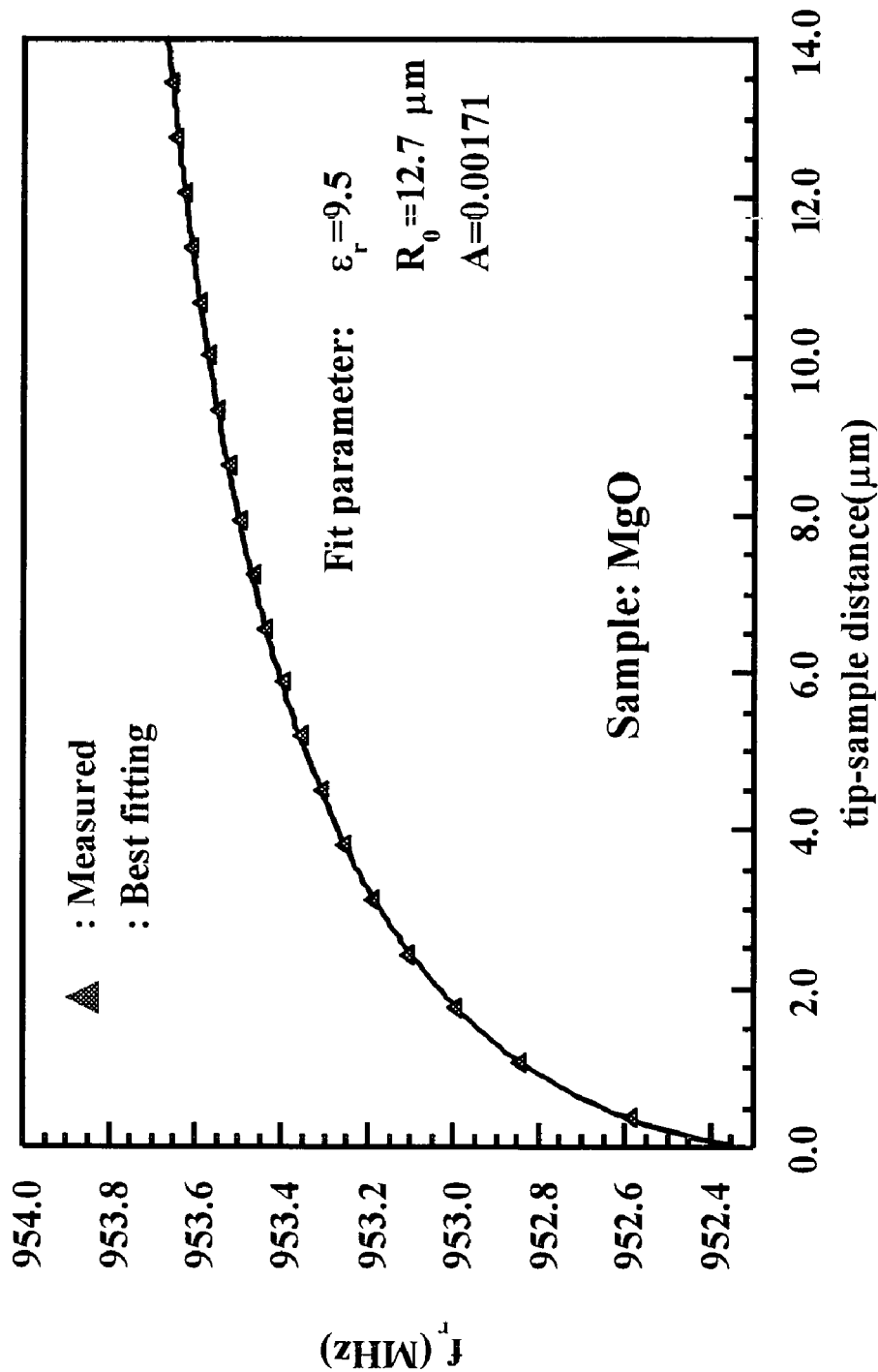
FIG. 4 is a graph showing the agreement between the calculated and measure frequency shifts for variation of the tip-sample separation.

FIG. 4 illustrates agreement between the calculated and measure frequency shifts for variation of the tip-sample separation. The dielectric constant and loss tangent can be determined from $C_{tip\text{-}sample}$ by a number of methods. One simple approach is to construct a look-up table which yields the dielectric constant corresponding to a given $C_{tip\text{-}sample}$. Alternatively, it can be directly calculated from the signals using the formula. Table 1 shows a comparison between measured and reported values for dielectric constant and loss tangent.

The perturbed electric field inside the sample is:

$$\vec{E}_1(\varepsilon, d) = \frac{q}{2\pi(\varepsilon + \varepsilon_0)} \sum_{n=1}^{\infty} t_n \frac{r\vec{e}_r + (z + a_n)\vec{e}_z}{[r^2 + (z + a_n)^2]^{3/2}} \quad (8)$$

where $q = 4\pi\varepsilon_0 RV_0$, $V_0$ is the voltage, and $\vec{e}_r$, and $\vec{e}_z$ are the unit vectors along the directions of the cylindrical coordinates r and z, respectively.

ii. Calculation of the Complex Dielectric Constant for Thin Films.

Figure 5:
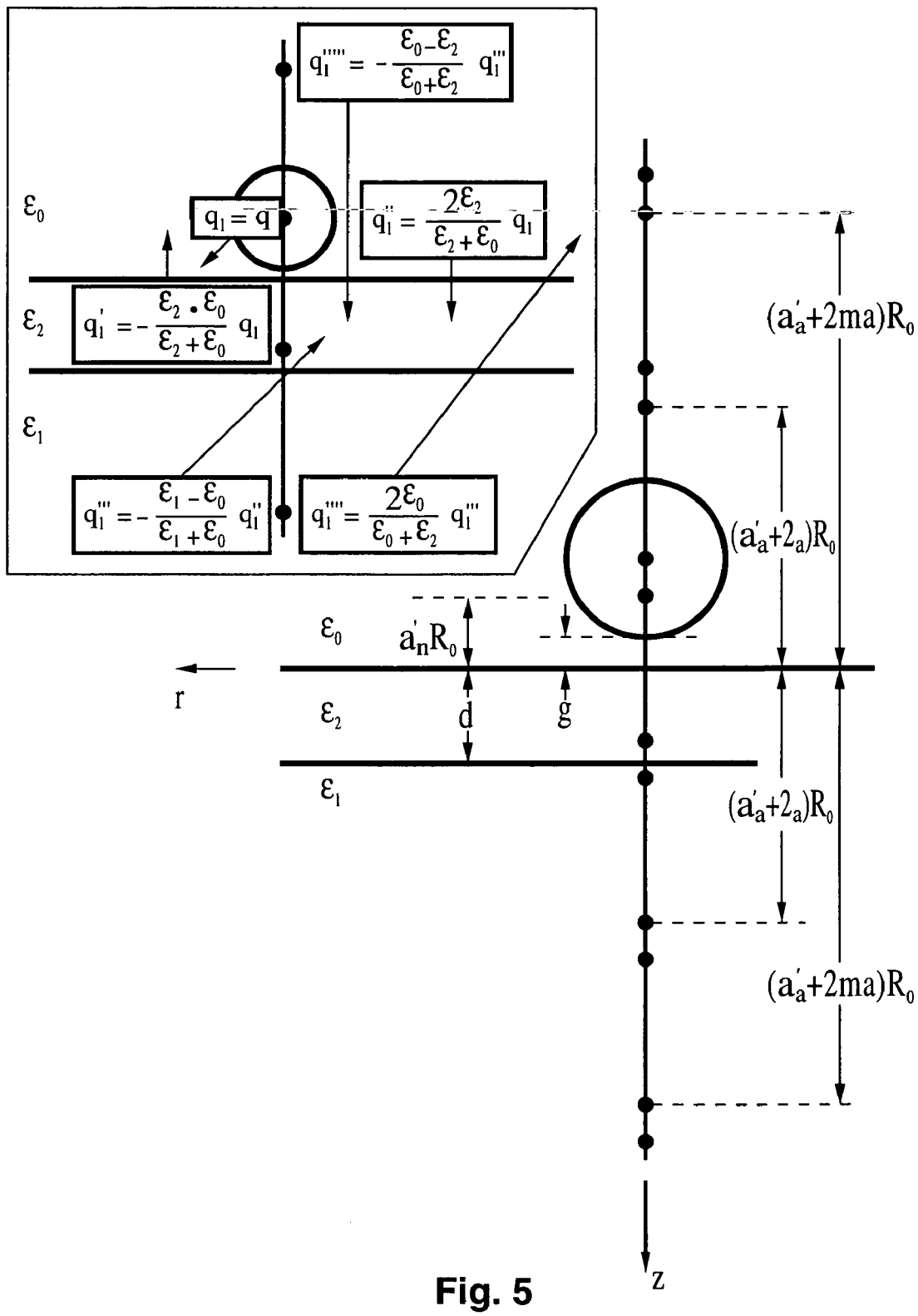
FIG. 5 illustrates the calculation of $C_{tip-sample}$.

The image charge approach can be adapted to allow the quantitative measurement of the dielectric constant and loss tangent of thin films. FIG. 5 illustrates the calculation of $C_{tip\text{-}sample}$. In the strict sense, the image charge approach will not be applicable to thin films due to the divergence of the image charges shown in FIG. 5. However, if the contribution of the substrate to the reaction on the tip can be modeled properly, the image charge approach is still a good approximation. According to the present invention, it is expected that all films can be considered as bulk samples if the tip is sharp enough since the penetration depth of the field is only about R. The contribution from the substrate will decrease with increases in film thickness and dielectric constant. This contribution can be modeled by replacing the effect of the reaction from the complicated image charges with an effective charge with the following format:

$$b_{eff} = b_{20} + (b_{10} - b_{20})\exp\left(-0.18\frac{a}{1 - b_{20}}\right), \quad (9)$$

where $$b_{20} = \frac{\varepsilon_2 - \varepsilon_1}{\varepsilon_2 + \varepsilon_1}, b_{10} = \frac{\varepsilon_1 - \varepsilon_0}{\varepsilon_1 + \varepsilon_0},$$

$\varepsilon_2$ and $\varepsilon_1$ are the dielectric constants of the film and substrate, respectively, $$a = \frac{d}{R},$$

and d is the thickness of the film. This format reproduces the thin and thick film limits for the signal. The constant 0.18 was obtained by calibrating against interdigital electride measurements at the same frequency on $SrTiO_3$ thin film. Following a similar process to the previous derivation, yields:

$$C_r = 4\pi\varepsilon_0 R \sum_{n=1}^{\infty} \sum_{m=0}^{\infty} b_{eff}^{n-1} b_{21}^m b_{10}^m \left( \frac{b_{20}}{n + 1 + 2mna} - \frac{b_{21}}{n + 1 + 2(m+1)na} \right), \quad (10)$$

$$C_i = 4\pi\varepsilon_0 R \sum_{n=1}^{\infty} \sum_{m=0}^{\infty} b_{eff}^{n-1} b_{21}^m b_{10}^m \left( \begin{array}{c} \tan\delta_2 \left( \frac{b_{20}}{n + 1 + 2mna} - \frac{b_{21}}{(n + 1 + 2(m+1)na)} \right) + \\ \frac{2\varepsilon_1\varepsilon_2\tan\delta_1}{(\varepsilon_2 + \varepsilon_1)(\varepsilon_2 + \varepsilon_0)} \frac{b_{21}}{(n + 1 + 2(m+1)na)} \end{array} \right), \quad (11)$$

where $$b_{21} = \frac{\varepsilon_2 - \varepsilon_1}{\varepsilon_2 + \varepsilon_1},$$

$\tan \delta_2$ and $\tan \delta_1$ are the tangent losses of the film and substrate. Table 2 lists the results of thin film measurements using the SEMP and interdigital electrodes at the same frequency (1 GHz).

b) Calculation of the Nonlinear Dielectric Constant

The detailed knowledge of the field distribution in Eqn. 8 allows quantitative calculation of the nonlinear dielectric constant. The component of the electric displacement D perpendicular to the sample surface is given by:

$$D_3 = P_3 + \varepsilon_{33}(E_l + E_m) + \tfrac{1}{2}\varepsilon_{333}(E_l + E_m)^2 + \tfrac{1}{6}\varepsilon_{3333}(E_l + E_m)^3 + \ldots \quad (12)$$

where $D_3$ is the electric displacement perpendicular to the sample surface, $P_3$ is the spontaneous polarization, $\varepsilon_{ij}$, $\varepsilon_{ijk}$, $\varepsilon_{ijkl}$, ... are the second-order (linear) and higher order (nonlinear) dielectric constants, respectively.

Since the field distribution is known for a fixed tip-sample separation, an estimate of the nonlinear dielectric constant from the change in resonance frequency with applied voltage can be made. For tip-sample separations much less than R, the signal mainly comes from a small region under the tip where the electric fields (both microwave electric field $E_m$ and low frequency bias electric field $E_l$) are largely perpendicular to the sample surface. Therefore, only the electric field perpendicular to the surface needs to be considered.

From Eqn. 12, the effective dielectric constant with respect to $E_m$ can be expressed as a function of $E_l$:

$$\varepsilon_{33}(E_l) = \frac{\partial D_3}{\partial E_m} = \varepsilon_{33} + \varepsilon_{333}(E_l + E_m) + \frac{1}{2}\varepsilon_{3333}(E_l + E_m)^2 + \ldots, \quad (13)$$

and the corresponding dielectric constant change caused by $E_l$ is:

$$\Delta\varepsilon = \varepsilon_{333} E_l + \tfrac{1}{2}\varepsilon_{3333} E_l^2 + \quad (14)$$

The change in $f_r$ for a given applied electric field $E_l$ is related to the change in the energy stored in the cavity. Since the electric field for a given dielectric constant is known and the change in the dielectric constant is small, this can be calculated by integrating over the sample:

$$\frac{df_r}{f_r} = \frac{\int_{V_s} \Delta\varepsilon E_m^2 \, dV}{\int_{V_t} (\varepsilon E_0^2 + \mu H_0^2) \, dV} = -\frac{\int_{V_s} \left(\varepsilon_{333} E_l + \tfrac{1}{2}\varepsilon_{3333} E_l^2 + \ldots\right) E_m^2 \, dV}{\int_{V_t} (\varepsilon E_0^2 + \mu H_0^2) \, dV} \quad (15)$$

where $V_s$ is the volume of the sample containing electric field, $H_0$ is the microwave magnetic field, and $V_t$ is the total volume containing electric and magnetic fields, possibly with dielectric filling of dielectric constant $\varepsilon$. $E_m$ is given by Eqn. 8. The application of a bias field requires a second electrode located at the bottom of the substrate. If the bottom electrode to tip distance is much larger than tip-sample distance and tip radius, Eqn. 8 should also hold for $E_l$. The upper portion can be calculated by integrating the resulting expression. The lower portion of the integral can be calibrated by measuring the dependence of $f_r$ versus the tip-sample separation for a bulk sample of known dielectric constant. If the tip-sample separation is zero, the formula can be approximated as:

$$C_r(V) = C_r(V=0) + 4\pi\varepsilon_0 R \frac{1}{32} \frac{A}{\varepsilon_{33}} \frac{V}{R} \frac{\varepsilon_{33} + \varepsilon_0}{2\varepsilon_0} \varepsilon_{333} \quad (16)$$

where V is the low frequency voltage applied to the tip. This calculation can be generalized in a straightforward fashion to consider the effects of other nonlinear coefficients and thin films.

Figure 6:
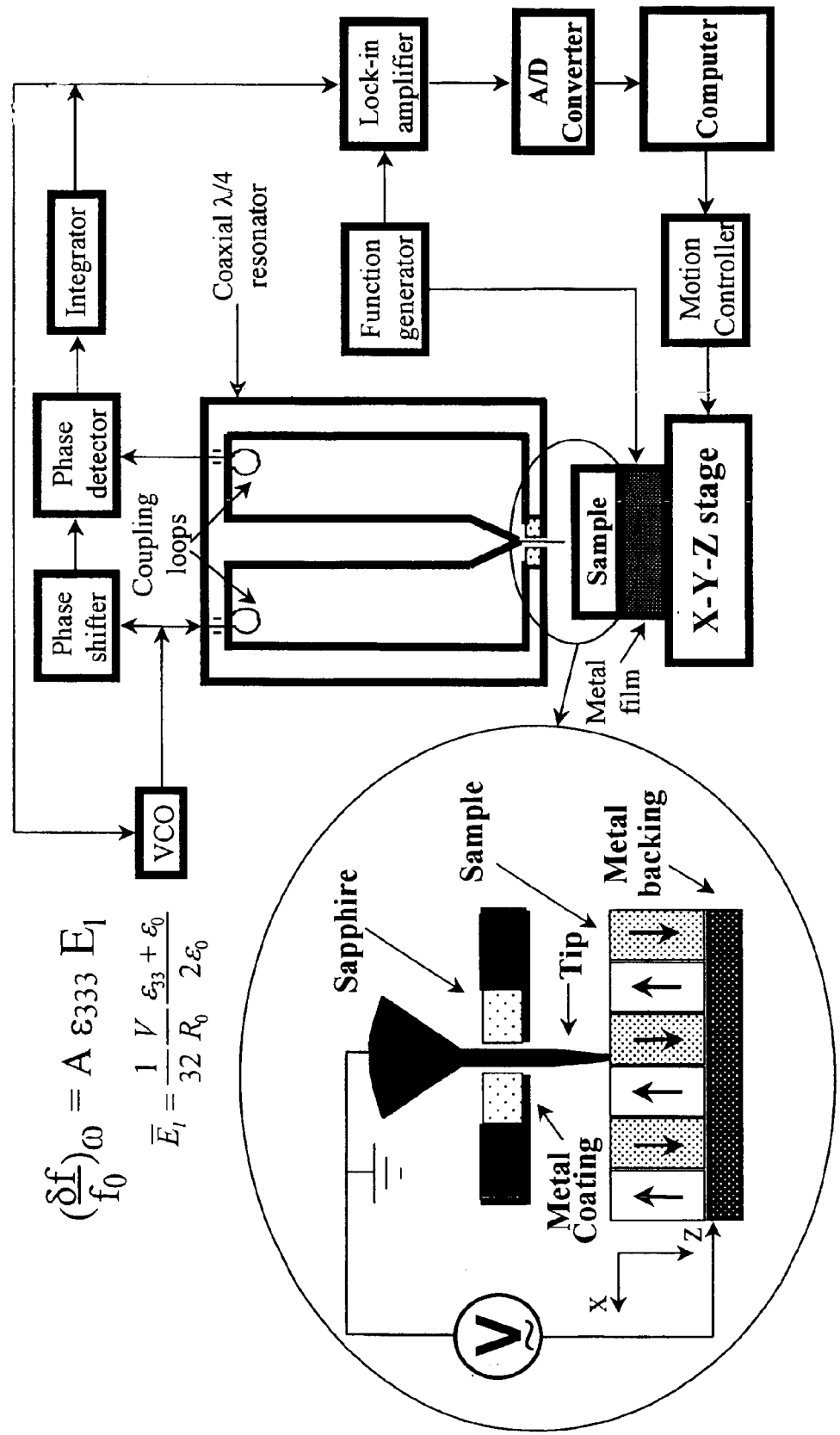
FIG. 6 is a schematic view of the setup used to measure the nonlinear dielectric constant.

FIG. 6 illustrates the setup used to measure the nonlinear dielectric constant. To measure $\varepsilon_{333}$, an oscillating voltage $V_\Omega$, of frequency $f_\Omega$, is applied to the silver backing of the sample and the output of the mixer is monitored with a lock-in amplifier (SR 830). This bias voltage will modulate the dielectric constant of a nonlinear dielectric material at $f_\Omega$. By measuring $f_r$ and the first harmonic variation in the phase output simultaneously, sample topography and $\varepsilon_{333}$ can be measured simultaneously.

Figure 7:
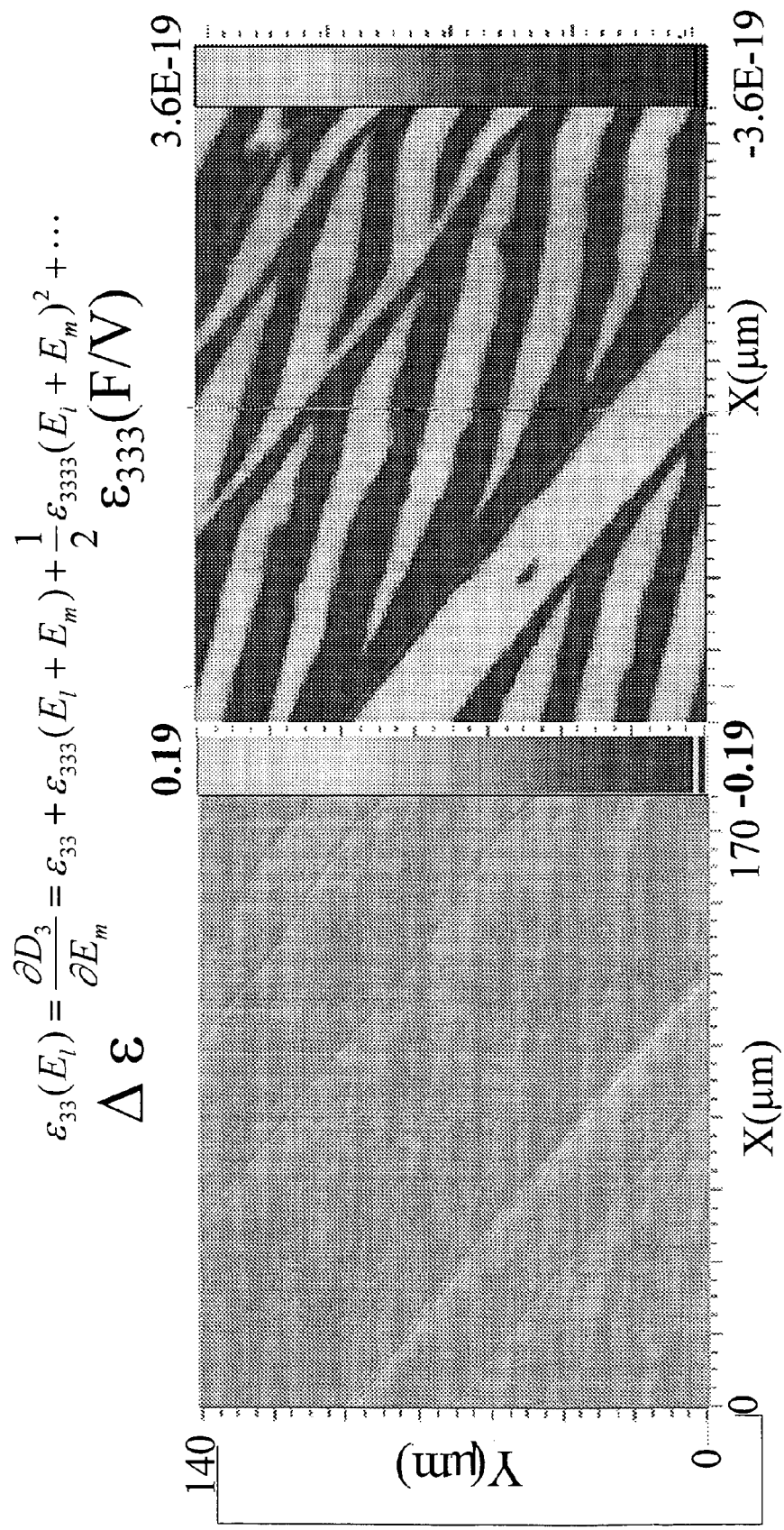
FIG. 7 shows images of topography and $\in_{333}$ for a periodically poled single-crystal $LiNbO_3$ wafer.

FIG. 7 shows images of topography and $\varepsilon_{333}$ for a periodically poled single-crystal LiNbO$_3$ wafer. The crystal is a 1 cm×1 cm single crystal substrate, poled by periodic variation of dopant concentration. The poling direction is perpendicular to the plane of the substrate. The dielectric constant image is essentially featureless, with the exception of small variations in dielectric constant correlated with the variation in dopant concentration. The nonlinear image is constructed by measuring the first harmonic of the variation in output of the phase detector using a lock-in amplifier. Since $\varepsilon_{ijk}$ reverses when the polarization switches, the output of the lock-in switches sign when the domain direction switches. The value (−2.4×10$^{-19}$ F/V) is within 20% of bulk measurements. The nonlinear image clearly shows the alternating domains.

c) Calculation of the Conductivity i. Low Conductivity

The dielectric constant of a conductive material at a given frequency f may be written as:

$$\varepsilon = \varepsilon_r + \frac{2i\sigma}{f},$$

where $\varepsilon_r$ is the real part of the permittivity and $\sigma$ is the conductivity. The quasistatic approximation should be applicable when the wavelength inside the material is much greater (>>) than the tip-sample geometry. For $R_0 \sim 1$ um and $\lambda \approx 14$ cm, $$\varepsilon_{max} \approx \left(\frac{\lambda}{R_0}\right)^2 \approx 2 \times 10^{10} \text{ or } \sigma_{max} \approx \frac{f\varepsilon_{max}}{2} \approx 2 \times 10^7 \frac{1}{\Omega-\text{cm}}. \quad (17)$$

For $\sigma \ll \sigma_{max}$, the quasistatic approximation remains valid. $C_{tip-sample}$ can be calculated by the method of images. Each image charge will be out of phase with the driving voltage. By calculating the charge (and phase shift) accumulated on the tip when it is driven by a voltage V, frequency f, one can calculate a complex capacitance. For moderate tip-sample separations, it is primarily a capacitance with a smaller real component.

Using the method of images, we find that the tip-sample capacitance is given by:

$$C_{tip-sample} = 4\pi\varepsilon_0 R_0 \sum_{n=1}^{\infty} \frac{bt_n}{a_1 + a_n}, \quad (18)$$

where $t_n$ and $a_n$ have the following iterative relationships:

$$a_n = 1 + a' - \frac{1}{1 + a' + a_{n-1}} \text{ and} \quad (19)$$

$$t_n = \frac{bt_{n-1}}{1 + a' + a_{n-1}} \quad (20)$$

with $$a_1 = 1 + a', t_1 = 1, b = \frac{\varepsilon - \varepsilon_0}{\varepsilon + \varepsilon_0},$$

and $$a' = \frac{d}{R},$$

where $\in = \in_r - i\in_i$ is the complex dielectric constant of the sample, $\square_0$ is the permittivity of free space, d is the tip-sample separation, and R is the tip radius.

By expressing $b = b_r + ib_i = |b|e^{i\varphi}$, the real and complex capacitances can be separated.

$$C_r = 4\pi\varepsilon_0 R_0 \sum_{n=1}^{\infty} \frac{|b|^n \cos(n\varphi) g_n}{a_1 + a_n} \text{ and} \quad (21)$$

$$C_r = 4\pi\varepsilon_0 R_0 \sum_{n=1}^{\infty} \frac{|b|^n \sin(n\varphi) g_n}{a_1 + a_n}, \quad (22)$$

where $g_1 = 1$ and $g_n$ is given by:

$$g_n = \frac{g_{n-1}}{1 + a' + a_{n-1}}. \quad (23)$$

This calculation can be generalized in a straightforward fashion to thin films.

Figure 8:
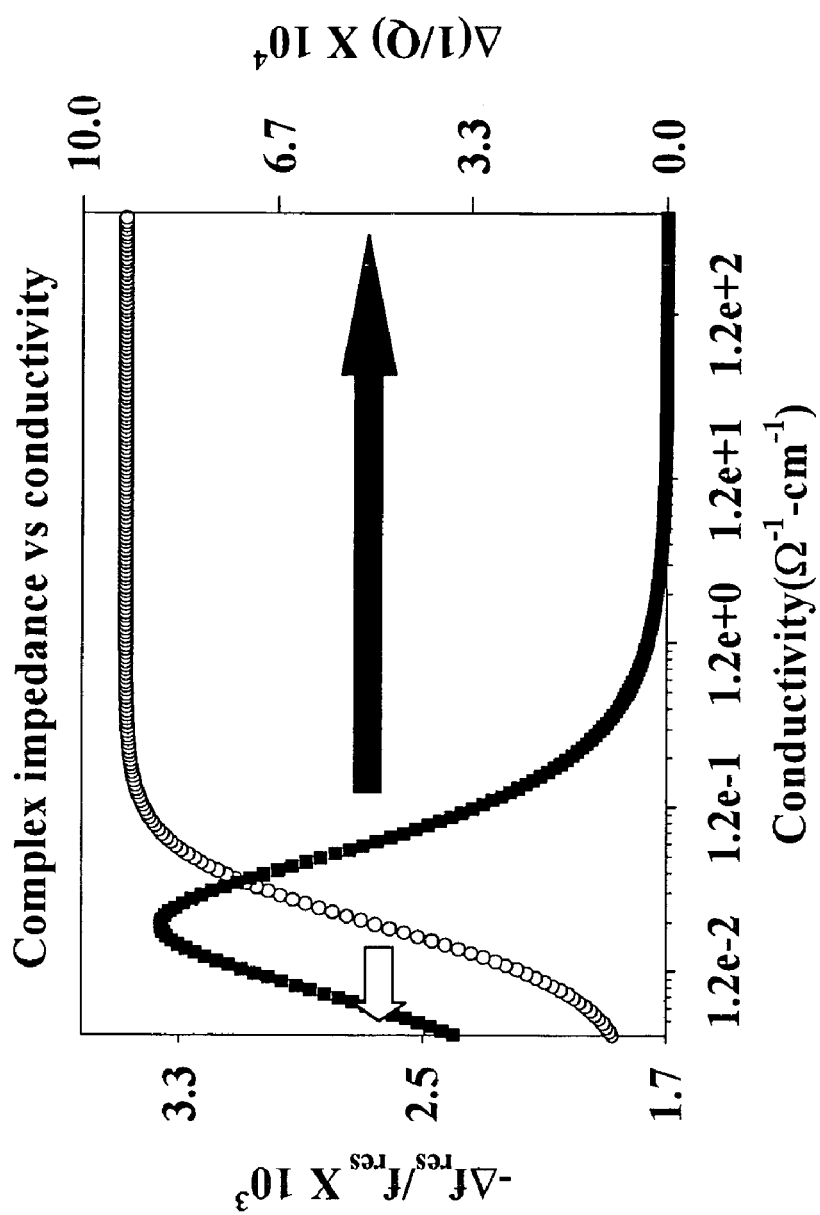
FIG. 8 is a graph showing $f_r$ and $\Delta(1/Q)$ as a function of conductivity.

FIG. 8 illustrates $f_r$ and $\Delta(1/Q)$ as a function of conductivity. The curve peaks approximately where the imaginary and real components of $\in$ become equal. For those plots, it is assumed that the complex dielectric constant was given by $$\varepsilon = 10 + i\frac{2\sigma}{f}.$$

ii. High Conductivity

For $\sigma > \sigma_{max}$, the magnetic field should also be considered. The real portion of $C_{tip-sample}$ can be derived using an image charge approach. This is identical to letting $b = 1$.

$$C_{tip-sample} = 4\pi\varepsilon_0 R_0 \sum_{n=1}^{\infty} \frac{t_n}{a_1 + a_n}, \quad (24)$$

where $t_n$ and $a_n$ have the following iterative relationships:

$$a_n = 1 + a' - \frac{1}{1 + a' + a_{n-1}} \text{ and} \quad (25)$$

$$t_n = \frac{t_{n-1}}{1 + a' + a_{n-1}} \quad (26)$$

with $$a_1 = 1 + a', t_1 = 1, b = \frac{\varepsilon - \varepsilon_0}{\varepsilon + \varepsilon_0},$$

and $$a' = \frac{d}{R},$$

where $\in$ is the dielectric constant of the sample, $\in_0$ is the permittivity of free space, d is the tip-sample separation, and R is the tip radius.

In this limit, the formula can also be reduced to a sum of hyperbolic sines; see E. Durand, Electrostatique, 3 vol. (1964-66).

$$C_r = 4\pi\varepsilon_0 R_0 \sinh\alpha \sum_{n=2}^{\infty} \frac{1}{\sinh n\alpha} \quad (27)$$

where $\alpha = \cos h^{-1}(1+a')$.

The magnetic and electric fields at the surface of the conductor are given by:

$$\vec{E}_s(r) = \frac{R_0}{2\pi\varepsilon_0} \sum_{n=1}^{\infty} \frac{a'_n q_n}{[r^2 + (a'_n R_0)^2]^{3/2}} \vec{e}_z \quad (28)$$

$$\vec{H}_s(r) = -i\frac{\omega}{2\pi r} \sum_{n=1}^{\infty} q_n \frac{[r^2 + (a'_n R_0)^2]^{1/2} - a'_n R_0}{[r^2 + (a'_n R_0)^2]^{1/2}} \vec{e}_\phi \quad (29)$$

The knowledge of this field distribution allows the calculation of the loss in the conducting sample.

Hyperbolic Tip

For tip-sample separations $< R_0$, a spherical tip turns out to be an excellent approximation, but the approximation does not work well for tip-sample separations $> R_0$. To increase the useful range of the quasistatic model, additional modeling is performed to accurately model the electric field over a larger portion of the tip. An exact solution exists for a given hyperbolic tip at a fixed distance from a conducting plane. The potential is:

$$\phi = \phi_0 \frac{\log\left[\frac{1+v}{1-v}\right]}{\log\left[\frac{1+v_0}{1-v_0}\right]}, \quad (30)$$

The surface charge/unit area is:

$$\sigma = \frac{1}{4\pi}E|_{v_0} = -\frac{1}{4\pi} \frac{2\phi_0}{a(1-v_0^2)} \frac{1}{\log\left[\frac{1+v_0}{1-v_0}\right]} \left[\frac{1-v_0^2}{u^2+1-v_0^2}\right]^{1/2} = \quad (31)$$

-continued $$-\frac{1}{4\pi}\frac{2\phi_0}{a(1-v_0^2)}\frac{1}{\log\left[\frac{1+v_0}{1-v_0}\right]}\left[\frac{1}{\frac{y^2}{a^2(1-v_0^2)^2}+1}\right]^{1/2}$$

The area/dy is:

$$y = au(1-v_0^2)^{1/2} \tag{32}$$

$$x = av_0(1-u^2)^{1/2}$$

$$\frac{dx}{dy} = av_0 \frac{y}{a^2(1-v_0^2)}\left[1+\frac{y^2}{a^2(1-v_0^2)}\right]^{-1/2},$$

$$\frac{dA}{dy} = 2\pi y\left(1+\left(\frac{dx}{dy}\right)^2\right)^{1/2} = 2\pi y\left[\frac{1+\frac{y^2}{a^2(1-v_0^2)^2}}{1+\frac{y^2}{a^2(1-v_0^2)}}\right]^{1/2}, \tag{33}$$

So, for a given $v_0$ and a, the charge on a hyperbolic tip between $y_{min}$ and $y_{max}$ is given by:

$$Q = \int_{y_{min}}^{y_{max}} \sigma \frac{dA}{dy} dy = \tag{34}$$

$$\frac{\phi_0}{a(1-v_0^2)}\frac{1}{\log\left[\frac{1+v_0}{1-v_0}\right]}\int_{y_{min}}^{y_{max}} dy\, y\left[1+\frac{y^2}{a^2(1-v_0^2)}\right]^{-1/2} =$$

$$\phi_0 a \frac{1}{\log\left[\frac{1+v_0}{1-v_0}\right]}\left[1+\frac{y^2}{a^2(1-v_0^2)}\right]^{1/2}\Bigg|_{y_{min}}^{y_{max}}$$

Given proper choice of the limits of integration and tip parameters, Eq. 34 may be used to more accurately model the tip-sample capacitance as detailed below.

iii. Large Tip-Sample Separations

Figure 9:
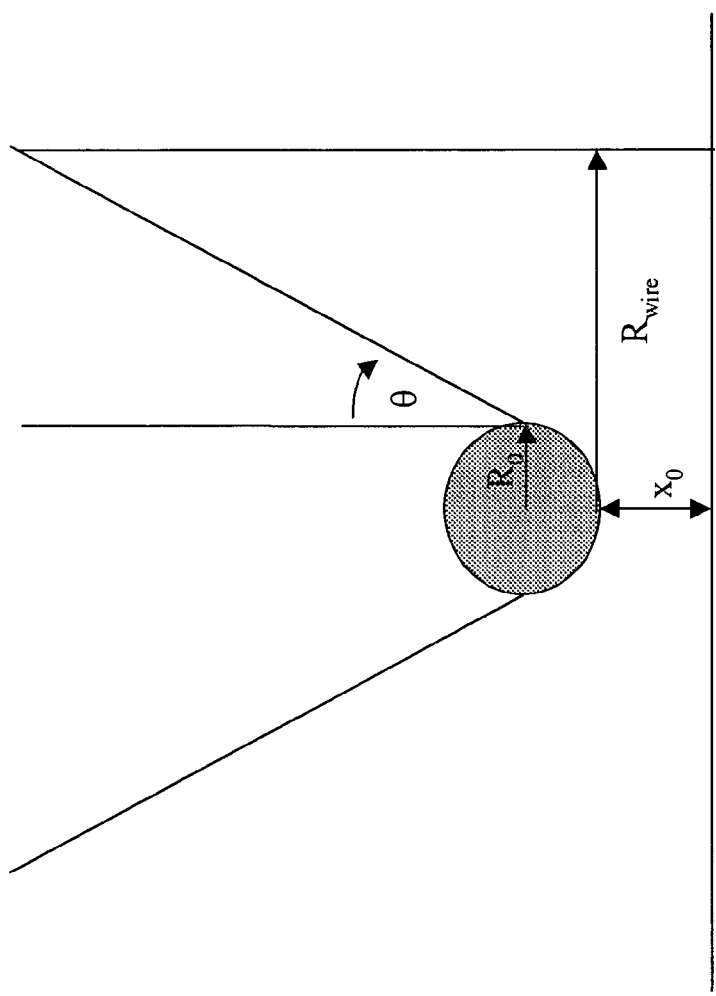
FIG. 9 illustrates the tip-sample geometry modeled.

The long-range dependence is modeled by calculating $C_{tip\text{-}sample}$. For large tip-sample separations, there is no problem. (separations roughly>tip radius). The capacitance is calculated as the sum of the contribution from a cone and a spherical tip. For the cone, the charge only outside the tip radius is considered. This solution can be approximately adapted to a variable distance. FIG. 9 describes the tip-sample geometry modeled; where:

Tip radius: $R_0$
Opening angle: $\theta$
Wire radius: $R_{wire}$
Tip-sample separation: $x_0$ To approximate the contribution of the conical portion of the tip to the tip-sample capacitance, the conical portion of the tip is divided into N separate portions, each portion n extending from $Y_{n-1}$ to $y_n$. For each portion, the hyperbolic parameters $(a, v_0)$ are found for which the hyperbola intersects and is tangent to the center of the portion.

Given points x, y on a hyperbola, and the slope s, find the hyperbola intersecting and tangent to point (x,y).

$$x = av(u^2+1)^{1/2} \tag{35}$$

$$y = au(1-v^2)^{1/2} \tag{36}$$

Eliminate u.

$$x = av\left(1+\frac{y^2}{(1-v^2)a^2}\right)^{1/2} \tag{37}$$

$$\frac{dx}{dy} = av\frac{y}{(1-v^2)a^2}\left(1+\frac{y^2}{(1-v^2)a^2}\right)^{-1/2} \tag{38}$$

Eliminate a.

From derivative equation:

$$a^2 = \frac{y^2}{s^2}\left(\frac{v^2(1+s^2)-s^2}{(1-v^2)^2}\right) \tag{39}$$

Substitute into equation for hyperbola:

$$\frac{x^2}{v^2}-\frac{y^2}{1-v^2} = a^2 = \frac{y^2}{s^2}\left(\frac{v^2(1+s^2)-s^2}{(1-v^2)^2}\right) \tag{40}$$

$$x^2(1-v^2)^2 - y^2v^2(1-v^2) = y^2(v^4-v^2) + \frac{y^2v^4}{s^2}$$

$$v = \frac{xs}{xs+y}, \tag{41}$$

get a from above. Finally, the charges accumulated on each portion of the tip are summed and a capacitance is obtained.

The contribution from each conical portion of the tip is given approximately by:

$$C_{ncone\text{-}sample} = a\frac{1}{\log\left[\frac{1+v_0}{1-v_0}\right]}\left[1+\frac{y^2}{a^2(1-v_0^2)}\right]^{1/2}\Bigg|_{y_{n-1}}^{y_n} \tag{42}$$

where $C_{n\ cone\text{-}sample}$ is the contribution to the tip-sample capacitance from the n th portion of the cone.

Assuming N equally spaced cone portions, for the sphere+cone tip modeled, here:

$$y_n = x_0 + R_0 + \cot\theta\left(n\frac{R_{wire}-R_0}{N}\right)$$

The total tip-sample capacitance is then given by the sum of the portions of the cone and the spherical portion of the tip, $C_{sphere\text{-}sample}$, as given by Eq. 24. ($C_{sphere\text{-}sample}$ is substituted for $C_{tip\text{-}sample}$ to reduce confusion.)

$$C_{tip\text{-}sample} = C_{sphere\text{-}sample} + \sum_{n=1}^{N} C_{ncone\text{-}sample}$$

Figure 10:
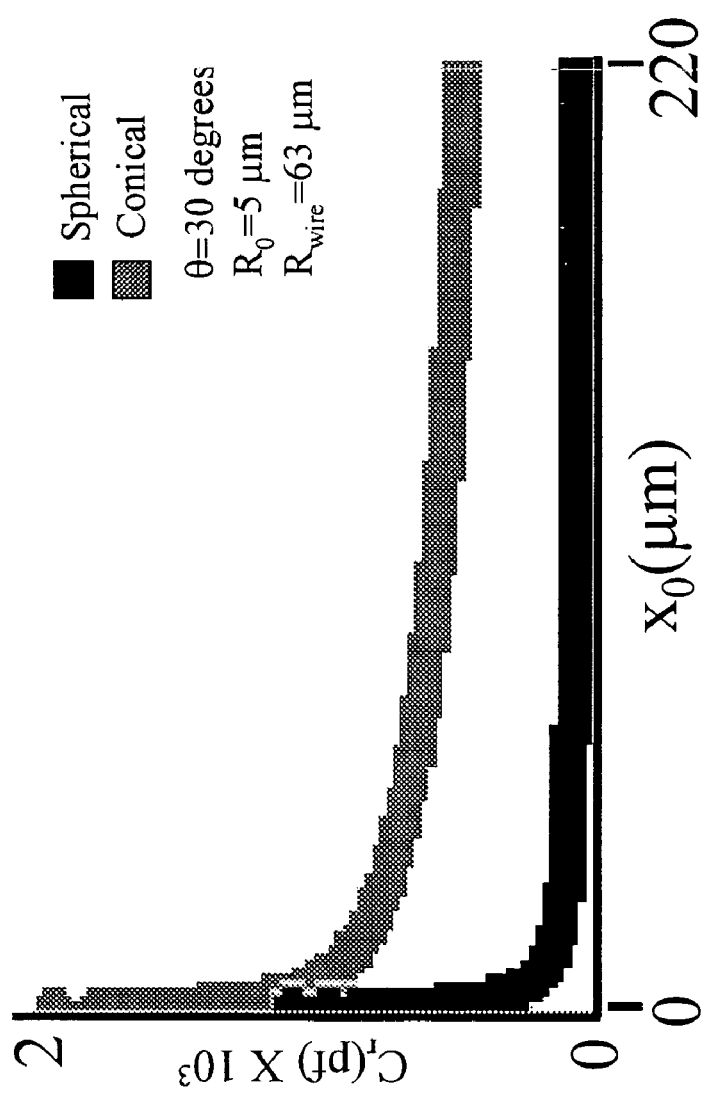
FIG. 10 is a graph showing $C_r$ using the model approximation.

For small tip-sample separations, this model does not work well. So the capacitance is calculated using the spherical model (which dominates) and the line tangent to the contribution from the cone is made. FIG. 10 shows $C_r$ using this approximation.

Embodiment B

The above described models are applied to the regulation of the tip-sample separation for dielectric and conductive materials. In principle, with above models, the relationship between tip sample distance, electrical impedance and measured signals ($f_r$ and Q as function of sample difference, bias fields and other variables) is known precisely, at least when the tip is very close to the sample. If measured $f_r$ and Q signal points (and their derivatives with respect to electric or magnetic fields, distance and other variables) are more than unknown parameters, the unknowns can be uniquely solved. If both tip-sample distance and electrical impedance can be determined simultaneously, then the tip-sample distance can be easily controlled, so that the tip is always kept above the sample surface with a desired gap (from zero to microns). Both topographic and electrical impedance profiles can be obtained. The calculation can be easily performed by digital signal processor or any computer in real time or after the data acquisition.

Since the physical properties are all calculated from the fr and Q and their derivatives, the temperature stability of the resonator is crucial to ensure the measurement reproducibility. The sensitivity very much depends on the temperature stability of the resonator. Effort to decrease the temperature variation of resonator using low thermal-coefficient-ceramic materials to construct the resonator should be useful to increase the sensitivity of the instrument.

d) Tip-Sample Distance Control for Dielectric Materials i.) For Samples of Constant Dielectric Constant, the Tip-Sample Separation can be Regulated by Measurement of $f_r$.

Other physical properties, i.e. nonlinear dielectric or loss tangent can be measured simultaneously.

Figure 11:
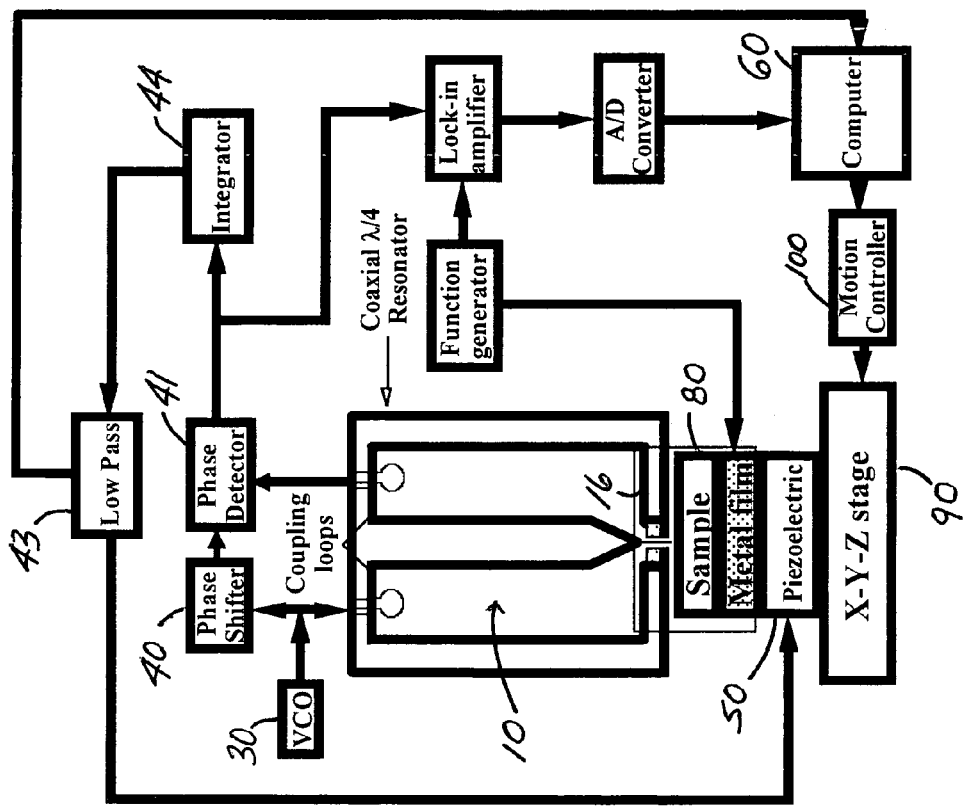
FIG. 11 is a schematic view of the operation of the microscope for simultaneous measurement of the topography and nonlinear dielectric constant.

FIG. 11 illustrates the operation of the microscope for simultaneous measurement of the topography and nonlinear dielectric constant. From the calibration curve of resonant frequency versus tip-sample separation, a reference frequency $f_{ref}$ is chosen to correspond to some tip-sample separation. To regulate the tip-sample distance, a phase-locked loop (FIG. 11) is used. A microwave signal of frequency $f_{ref}$ is input into the cavity 10, with the cavity output being mixed with a signal coming from a reference path. The length of the reference path is adjusted so that the mixed output is zero when the resonance frequency of the cavity matches $f_{ref}$. The output of the phase detector 41 is fed to an integrator 44, which regulates the tip-sample distance by changing the extension of a piezoelectric actuator 50 (Burleigh PZS-050) to maintain the integrator output near zero. For samples with uniform dielectric constant, this corresponds to a constant tip-sample separation. To measure $\in_{333}$, an oscillating voltage $V_\Omega$, of frequency $f_\Omega$, is applied to the silver backing of the sample and the output of the phase detector is monitored with a lock-in amplifier (SR 830). This bias voltage will modulate the dielectric constant of a nonlinear dielectric material at $f_\Omega$. Since $f_\Omega$ exceeds the cut-off frequency of the feedback loop, the high frequency shift in $\in$ from $V_\Omega$ does not affect the tip-sample separation directly. By measuring the applied voltage to the piezoelectric actuator and the first harmonic variation in the phase output simultaneously, sample topography and $\in_{333}$ can be measured simultaneously.

Figure 12:
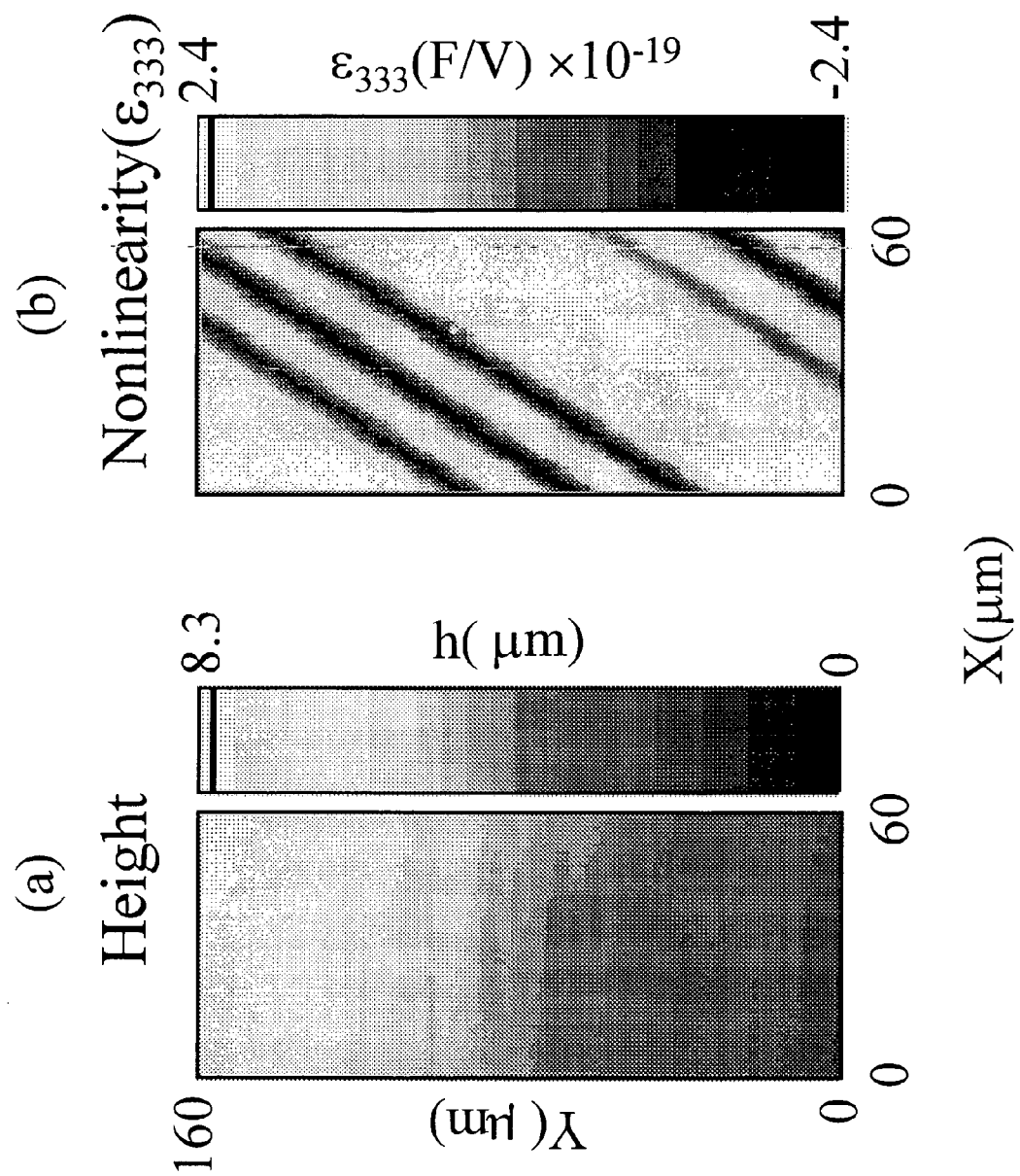
FIG. 12 shows images of topography and $\in_{333}$ for a periodically poled single-crystal $LiNbO_3$ wafer.

FIG. 12 shows images of topography and $\in_{333}$ for a periodically poled single-crystal $LiNbO_3$ wafer. The crystal is a 1 cm×1 cm single crystal substrate, poled by application of a spatially periodic electric field. The poling direction is perpendicular to the plane of the substrate. The topographic image is constructed by measuring the voltage applied to the piezoelectric actuator. It is essentially featureless, with the exception of a constant tilt and small variations in height correlated with the alternating domains. The small changes are only observable if the constant tilt is subtracted from the figure. Since $\in_{ijk}$ is a third-rank tensor, it reverses sign when the polarization switches, providing an image of the domain structure. The nonlinear image is constructed by measuring the first harmonic of the variation in output of the phase detector using a lock-in amplifier. Since $\in_{ijk}$ reverses when the polarization switches, the output of the lock-in switches sign when the domain direction switches. The value (−2.4× $10^{-19}$ F/V) is within 20% of bulk measurements. The nonlinear image clearly shows the alternating domains.

Ferroelectric thin films, with their switchable nonvolatile polarization, are also of great interest for the next generation of dynamic random access memories. One potential application of this imaging method would be in a ferroelectric storage media. A number of instruments based on the atomic force microscope have been developed to image ferroelectric domains either by detection of surface charge or by measurement of the piezoelectric effect. The piezoelectric effect, which is dependent on polarization direction, can be measured by application of an alternating voltage and subsequent measurement of the periodic variation in sample topography. These instruments are restricted to tip-sample separations less than 10 nanometers because they rely on interatomic forces for distance regulation, reducing the possible data rate. Since the inventive microscope measures variations in the distribution of an electric field, the tip-sample separation can be regulated over a wide range (from nanometers to microns).

ii.) For Samples with Varying Dielectric Constant, $f_r$ Changes with $\in$.

To extract the dielectric constant and topography simultaneously, an additional independent signal is required. This can be accomplished in several ways:

1. Measuring more than one set of data for $f_r$ and Q at different tip-sample distances. This method is especially effective when the tip-sample distance is very small. The models described in Embodiment A can then be used to determine the tip-sample distance and electrical impedance through DSP or computer calculation. In this approach, as the tip is approaching the sample surface the DSP will fit the tip-sample distance, dielectric constant and loss tangent simultaneously. These values should converge as the tip-sample distance decreases. Therefore, this general approach will provide a true non-contact measurement mode, as the tip can kept at any distance away from the sample surface as long as the sensitivity (increase as tip-sample distance decreases) is enough for the measurement requirement. This mode is referred to as non-contact tapping mode. During the scanning, at each pixel the tip is first pull back to avoid crash before lateral movement. Then the tip will approach the surface as DSP calculate the dielectric properties and tip-sample distance. As the measurement value converge to have less error than specified or calculated tip-sample distance is less than a specified value, the tip stop approaching and DSP record the final values for that pixel. In this approach, a consistent tip-sample moving element is critical, i.e. the element should have a reproducible distance vs, e.g. control voltage. Otherwise, it increases the fitting difficulty and measurement uncertainty. This requirement to the z-axis moving element may be hard to satisfy. An alternative method is to independently encode the z-axis displacement of the element. Capacitance sensor and optical interferometer sensor or any other distance sensor can be implemented to achieve this goal.

2. In particular, when the tip is in soft contact (only elastic deformation is involved) to the surface of the sample, there will be a sharp change in the derivatives of signals (fr and Q)

as function of approaching distance. This method is so sensitive that it can be used to determine the absolute zero of tip-sample distances without damaging the tip. Knowing the absolute zero is very useful and convenient for further fitting of the curve to determine the tip-sample distance and electrical impedance. A soft contact "tapping mode" (as described in above) can be implemented to perform the scan or single point measurements. The approaching of tip in here can be controlled at any rate by computer or DSP. It can be controlled interactively, i.e. changing rate according to the last measurement point and calculation.

3. The method described in 1) can be alternatively achieved by a fixed frequency modulation in tip-sample distance and detected by a lock-in amplifier to reduce the noise. The lock-in detected signal will be proportional to the derivative of $f_r$ and Q as function of tip-sample distance. A sharp decrease in this signal can be used as a determination of absolute zero (tip in soft contact with sample surface without damaging the tip). Using relationships described in Embodiment A, any distance of tip-sample can be maintained within a range that these relationship is accurate enough.

Details

At a single tip-sample separation, the microwave signal is determined by the dielectric constant of the sample. However, the microwave signal is a function of both the tip-sample separation and the dielectric constant. Thus, the dielectric constant and tip-sample separation can be determined simultaneously by the measurement of multiple tip-sample separations over a single point. Several methods can be employed to achieve simultaneous measurement of tip-sample separation and dielectric constant. First, the derivative of the tip-sample separation can be measured by varying the tip-sample separation. Given a model of the tip-sample capacitance, (Eqn. 3), the tip-sample separation and dielectric constant can then be extracted. The dependence on tip-sample separation and dielectric constant can be modeled using a modified fermi function.

$$C_r = 4\pi\varepsilon_0 R \frac{\ln(1-b)/b + 1}{\exp\{G(\varepsilon)[\ln a' - x_0(\varepsilon)]\} + 1} \quad (43)$$

where $b=(\in-\in_0)/(\in+\in_0)$. Furthermore, $G(\in)$ and $x_0(\in)$ can be fitted well with rational functions as:

$$\begin{cases} G(\varepsilon) = \frac{9.57\times10^{-1} + 2.84\times10^{-2}\varepsilon + 3.85\times10^{-5}\varepsilon^2}{1 + 4.99\times10^{-2}\varepsilon + 1.09\times10^{-4}\varepsilon^2} \\ x_0(\varepsilon) = -\frac{5.77\times10^{-1} + 1.31\times10^{-1}\varepsilon + 3.55\times10^{-4}\varepsilon^2}{1 + 3.68\times10^{-2}\varepsilon + 5.16\times10^{-5}\varepsilon^2} \end{cases} \quad (44)$$

Figure 13:
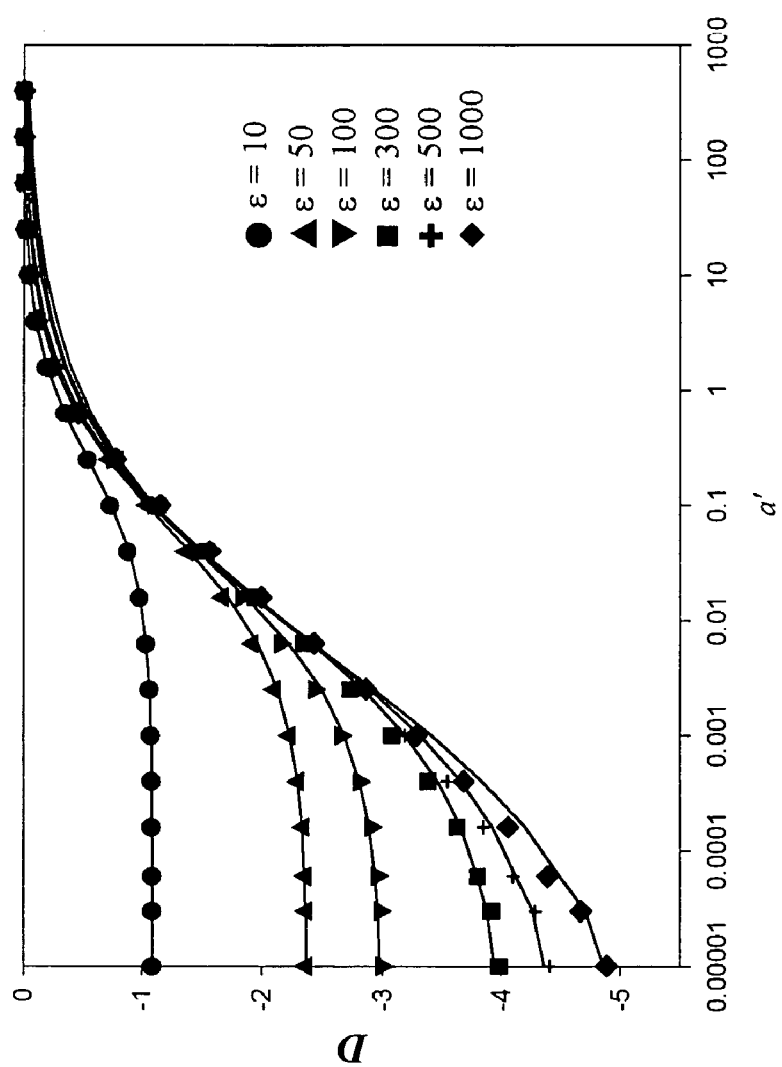
FIG. 13 is a graph for the $C_{tip-sample}$ calculation.

FIG. 13 illustrates the agreement between Eqn. 3 and Eqn. 43.

Equation 43 is suitable for rapid calculation of the tip-sample separation and dielectric constant. The tip-sample separation and dielectric constant can also be extracted by construction of a look-up table. The architecture described in f) below is then used to regulate the tip-sample separation. FIG. 14a and FIG. 14b show the variation of the derivative signal versus tip-sample variation. FIG. 14a is modeled assuming a 10 µm spherical tip. FIG. 14b is a measured curve. Maintaining the tip-sample separation at the maximum point of the derivative signal can also regulate the tip-sample separation. This has been demonstrated by scanning the tip-sample separation and selecting the zero slope of the derivative signal. It can also be accomplished by selecting the maximum of the second harmonic of the microwave signal.

e) Tip-Sample Distance Control for Conductive Materials

For conductive materials, the tip-sample separation and microwave resistivity can be measured simultaneously in a similar fashion. Since Eqn. 24 is independent of conductivity for good metals, $C_{tip-sample}$ can be used as a distance measure and control. This solution should be generally applicable to a wide class of scanned probe microscopes that include a local electric field between a tip and a conducting sample. It should prove widely applicable for calibration and control of microscopes such as scanning electrostatic force and capacitance microscopes.

From the calibration curves, a frequency $f_{ref}$ is chosen to correspond to some tip sample separation (FIG. 15). The tip-sample separation is then regulated to maintain the cavity resonance frequency at $f_{ref}$. This can be accomplished digitally through the use of the digital signal processor described in f) below. An analog mechanism can and has also been used. A phase-locked loop described in FIG. 11 has also been used to regulate the tip-sample separation. FIG. 16(a)(c) illustrate the measurement of topography with constant microwave conductivity. FIG. 16(b)(d) illustrate the measurement of conductivity variations.

This method allows submicron imaging of the conductivity over large length scales. This method has the advantage of allowing distance regulation over a wide length scale (ranging from microns to nanometers) giving rise to a capability analogous to the optical microscope's ability to vary magnification over a large scale.

Force Sensor Distance Feedback Control

In many cases, an absolute and independent determination of zero-distance is desirable as other methods can rely on model calculations and require initial calibration and fitting. A method that relies on measuring the vibration resonant frequency of the tip as a force sensor has been implemented. When the tip approaches the sample surface, the mechanical resonant frequency of the tip changes. This change can be used to control the tip-sample distance. This approach has been shown to be feasible and that this effect does exist. This effect has been found to exist over a very long range (~1 micron). The long-range effect is believed to come from the electrostatic force and the short-range effect is from a shear force or an atomic force. A low frequency DDS-based digital frequency feedback control electronics system similar to the microwave one discussed above is implemented to track the resonant frequency and Q of this mechanical resonator. The measure signals will then be used to control the distance. This is similar to shear force measurement in near field scanning microscope (NSOM). The signal is derived from the microwave signal, not from separate optical or tuning fork measurements as in other methods. This feature is important since no extra microscope components are required. The electronics needed is similar to the high frequency case. This features is critical for high-resolution imaging and accurate calibration of the other two methods.

Integration of AFM

It is very useful to integrate an atomic force microscope (AFM) tip with SEMM in some applications where a high-resolution topography image is desirable. The tip resonant frequency (10 kHz) and quality factor limit the bandwidth of shear force feedback in closed loop applications. Previously, in a scanning capacitance microscope (SCM), an AFM tip has been connected to a microwave resonator sensor to detect the change in capacitance between the tip and the bottom electrode. In principle, SCM is similar to our SEMM. However, insufficient coupling between the tip and resonator, very large parasitic capacitance in the connection, and lack of shielding for radiation prevented the SCM from having any sensitivity in direct (dc mode) measurements of the tip-sample capacitance without a bottom electrode and ac modulation. (SCM only can measure dC/dV).

A new inventive design will allow easy integration of an AFM tip to the SEMM without losing the high sensitivity experienced with the SEMM. This new design is based on a modification stripline resonator with the inventors' proprietary tip-shielding structure (see FIG. 21). Since the AFM tip is connected within less than 1 mm of the central strip line, the sensitivity will not be reduced seriously and parasitic capacitance with be very small (shielding also reduces the parasitic capacitance). The AFM tip is custom designed to optimize the performance. With this unique inventive design, nanometer resolution can be achieved in both topography and electrical impedance imaging, which is critical in gate oxide doping profiling and many other applications.

Embodiment C

By contrast to most types of microscope, SEMM measures a complex quantity, i.e., the real and imaginary parts of the electrical impedance. This is realized by measuring the changes in the resonant frequency ($f_r$) and quality factor (Q) of the resonator simultaneously. A conventional method of measuring these two quantities is to sweep the frequency of the microwave generator and measure the entire resonant curve. For each measurement, this can take seconds to minutes depending on the capabilities of the microwave generator. These measurements are limited by the switching speed of a typical microwave generator to roughly 20 Hz. With the use of a fast direct digital synthesizer based microwave source, the throughput can be improved to roughly 10 kHz, but is still limited by the need to switch over a range of frequencies. Another method is to implement an analog phase-locked loop for frequency feedback control. This method can track the changing resonant frequency in real time and measure $f_r$ and Q quickly. However, one has to use a voltage-controlled-oscillator (VCO) as a microwave generator which usually only has a frequency stability of $10^{-4}$. This low frequency stability will seriously degrade the sensitivity of the instrument. Since $\Delta\epsilon/\epsilon \sim 500\, \Delta f_r/f_r$, frequency instability in the VCO will limit measurement accuracy. Another problem is that interaction between this frequency feedback loop and the tip-sample distance feedback loop can cause instability and oscillation, which will seriously limit the data rate.

A direct digital synthesizer (DDS) based microwave generator is used to implement the method according to the present invention. In a preferred embodiment, the DSS has a frequency stability of better than $10^{-9}$. The inventive method fixes the frequency of the microwave signal at the previous resonant frequency and measures I/Q signals simultaneously. Since the microwave frequency is fixed, the DDS switching speed does not limit the data rate. By measuring the in-phase and quadrature microwave signals, the inventors can derive $f_r$ and Q. Near resonance, the in-phase and quadrature signals are given by:

i=A sin θ

Q=A cos θ, where A is the amplitude of the microwave signal on resonance and θ is the phase shift of the transmitted wave. Given i, q, the current input microwave frequency, and the input coupling constants, the current $f_r$ and Q can be calculated. For a resonator with initial quality factor $Q_0$, transmitted power $A_0$, and resonant frequency $f_0$, driven at frequency f, $$\Delta f = \frac{1}{2}\tan\theta \frac{f_r}{Q}$$
$$= \frac{1}{2}c\frac{\sin\theta}{A},$$
$$f_r = f - \Delta f$$
$$Q = \frac{1}{c}f_r\frac{A}{\cos\theta},$$

where $$c = \frac{A_0 f_0}{Q_0}$$

Then, $f_r$ and Q can be obtained by $$f_r = f - \frac{1}{2}c\frac{i}{i^2+q^2}$$
$$Q = \frac{1}{c}f_r\frac{i^2+q^2}{q}$$

Initially, since the I/Q mixer does not maintain perfect phase or amplitude balance, these quantities are calibrated. To calibrate the relative amplitudes at a given frequency of the i and q outputs of the mixer, the relative values of the outputs are measured when the reference signal is shifted by 90 degrees. This can easily be extended by means of a calibration table.

To calibrate the relative phases of the i and q outputs at a given frequency, the i output of the mixer is measured on resonance. At resonance, i/q=δ, where δ is the phase error of the I/Q mixer.

Near resonance, $$i = A\sin(\theta+\delta) = A\sin\theta\cos\delta + A\sin\delta\cos\theta$$
$$= A\sin\theta + A\delta\cos\theta$$
$$= A\sin\theta + q\delta$$

This allows the correction of the phase error of the mixer.

This method of measurement only requires one measurement cycle. Therefore, it is very fast and limited only by the DSP calculation speed. To increase the working frequency range, the DSP is used to control the DDS frequency to shift when the resonant frequency change is beyond the linear range. This method allows data rates around 100 kHz-1 MHz (limited by the bandwidth of the resonator) and frequency sensitivity below 1 kHz $$\left(\frac{\Delta f_r}{f_r} \approx 10^{-6} \text{ to } 10^{-7}\right).$$

f) Data Acquisition and Control Electronics

FIGS. 17 and 18 illustrate the architecture of the inventive data acquisition and control electronics. FIG. 17 contains a schematic for the EMP. FIG. 18 is a flow chart describing the operation of the SEMP.

To eliminate the communication bottleneck between data acquisition, control electronics and the computer, the high performance PCI bus is adopted for every electronic board. A main board with four high-speed digital signal processors (DSPs) is used to handle data acquisition, feedback control loops and other control functions separately. Four input data signals (A/Ds) and six control signals (D/As) were implemented.

The input signals include:

1) in-phase (I=A sin θ, where A is the amplitude and θ the phase) signal,
2) quadrature (q=A cos θ) signal,
3) in-phase signal of tip vibration resonant frequency or tapping mode signal or electric/magnetic/optical field modulations,
4) quadrature signal of tip vibration resonance, The output signals include:

1-3) fine x-y-z piezo-tube control signals,
4) z-axis coarse piezo-step-motor signal,
5-6) coarse x-y stage signals.

The DSPs are dedicated to specific functions as follows:

DSP1: microwave frequency $f_r$ and Q data acquisition,
DSP2: tip mechanical resonant frequency $f_m$ and $Q_m$ or microwave derivative signal data acquisition,
DSP3: tip-sample distance feedback control,
DSP4: x-y fine/coarse scan and image data acquisition, The division of labor between a number of fast processors simplifies design and allows rapid processing of multiple tasks. A fast system bus is necessary to allow rapid transfer of data to the display and between neighboring boards.

Stepping Motor—coarse positioning

Embodiment D

For all scanned probe microscopes, increasing resolution decreases the measurable scan range. Microscopes must be able to alter their scan position by millimeters to centimeters while scanning with high resolution over hundreds of microns. Given samples of macroscopic scale, means must exit to adjust the tip-sample separation over macroscopic (mm) distances with high stability over microscopic distances (nm). Conventional piezoelectric positioners are capable only of movements in the range of hundreds of microns and are sensitive to electronic noise even when stationary. In addition, they are subject to large percentage drifts. (>1% of scan range) As such, separate means of coarse and fine adjustment of position are necessary. A coarse approach inventive mechanism by means of a novel piezoelectric stepper motor has been designed to accomplish this.

FIG. 19 illustrates the design and operation of the stepper motor. The cross-sectional view illustrates that the motor consists of a sapphire prism in the form of an equilateral triangle clamped into an outer casing. There are 3 Piezoelectric stacks topped by a thin sapphire plate contact each side of the prism. Each piezoelectric stack consists of a lower expansion plate, which is used to grip and release the prism, an upper shear plate, which is used to move the prism, and a thin sapphire plate, which is used to provide a uniform surface. FIG. 20 shows the sequence of motion. At step (a), the motor is stationary. At step (b), a smooth rising voltage is applied to each shear place and the center prism moves. At step (c), the voltage to the expansion plates labeled (2) is reduced. This reduces the pressure applied by those plates and thus the frictional force. The center points the motor fixed. At step (d), the voltage to the shear plates labeled (1) is reduced. Since the plates have been retracted, the friction between these plates and the prism is reduced, letting the center plates hold the prism. At step (e), the voltage to the expansion plates labeled (2) is increased, increasing the pressure applies by the other plates. At step (F), the voltage to the expansion plates labeled (4) is reduced. The outer points hold the motor fixed. At step (g), the voltage to the shear plates labeled (3) is reduced. At step (h), the voltage to the expansion plates labeled (4) is increased, restoring the pressure applied by the center points to its original value. This motor has a number of advantages by comparison to earlier designs. Prior designs had only 2 piezoelectric elements per side and relied on a stick-slip motion, similar to pulling a tablecloth from under a wineglass. The use of a third piezoelectric element on each side and the addition of an expansion piezoelectric have several benefits. First, since the method of motion does not involve slip-stick, it is less prone to vibration induced by the necessary sharp motions. Second, the requirements for extreme cross-sectional uniformity of the central element are reduced by the use of the expansion piezoelectric plates.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

TABLE 1

Single Crystal Measurement

| Material | Measured $\epsilon^r$ | Reported $\epsilon^r$ | Measured tanδ | Reported tanδ |
|---|---|---|---|---|
| YSZ | 30.0 | 29 | $1.7 \times 10^{-3}$ | $1.75 \times 10^{31\ 3}$ |
| LaGaO$_3$ | 23.2 | 25 | $1.5 \times 10^{-3}$ | $1.80 \times 10^{-3}$ |
| CaNdAlO$_4$ | 18.2 | ~19.5 | $1.5 \times 10^{-3}$ | $0.4\text{-}2.5 \times 10^{-3}$ |
| TiO$_2$ | 86.8 | 85 | $3.9 \times 10^{-3}$ | $4 \times 10^{-3}$ |
| BaTiO$_3$ | 295 | 300 | 0.47 | 0.47 |
| YAlO$_3$ | 16.8 | 16 | — | $8.2 \times 10^{-5}$ |
| SrLaAlO$_4$ | 18.9 | 20 | — | — |
| LaALO$_3$ | 25.7 | 24 | — | $2.1 \times 10^{-5}$ |
| MgO | 9.5 | 9.8 | — | $1.6 \times 10^{-5}$ |
| LiNbO$_3$(X-cut) | 32.0 | 30 | — | — |

TABLE 2

| Films | SEMM (1 GHz) | | @Interdigital Electrodes (1 GHz) | |
|---|---|---|---|---|
| | $\epsilon_r$ | tanδ | $\epsilon_r$ | tanδ |
| Ba$_{0.7}$Sr$_{0.3}$TiO$_3$ | 707 | 0.14 | 750 | 0.07 |
| Ba$_{0.5}$Sr$_{0.5}$TiO$_3$ | 888 | 0.19 | 868 | 0.10 |
| SrTiO$_3$ | 292 | 0.02 | 297 | 0.015 |
| Ba$_{0.24}$Sr$_{0.35}$Ca$_{0.41}$TiO$_3$ | 150 | 0.05 | | |
| *Ba$_{0.25}$Sr$_{0.35}$Ca$_{0.4}$TiO$_3$ | 240 | 0.05 | | |

@Measurement by S. Kirchoefer and J. Pond, NRL also consistent with results by NIST group
*Film made by H. Jiang and V. Fuflyigin, NZ Applied Technology
Loss values are higher since we are more sensitive to surface.

We claim:

1. A scanning evanescent microwave microscope, comprising:
   a scanned evanescent microwave element comprising a resonating cavity having an aperture in an electrically conducting endwall and having a center conducting element comprising a tip that extends through the aperture beyond the endwall to form said tip;
   frequency measuring means electrically coupled to said tip, for measuring an initial and a final resonant frequency of the resonating cavity, called a frequency shift;
   energy measuring means electrically coupled to said resonating cavity for measuring an initial and final ratio of electromagnetic energy dissipated and stored in said resonating cavity, called a Q shift;
   a computing element operative to calculate a dielectric constant and a loss tangent for a material placed near said tip in response to said measured frequency shift and Q shift; and
   means for holding said material relative to said tip, said holding means being controlled by a stepping motor having nanometer stability.

2. The scanning evanescent microwave microscope of claim 1, wherein the scanned evanescent microwave element is a scanned evanescent microwave probe.

3. The scanning evanescent microwave microscope of claim 1,
   further including a feedback element for controlling the distance between the tip and the material.

4. The scanning evanescent microwave microscope of claim 3, wherein said feedback element controls tip-sample distance and its relation to dielectric constant according to the following model equation:

$$C_r = 4\pi\varepsilon_0 R \frac{\ln(1-b)/b + 1}{\exp\{G(\varepsilon)[\ln a' - x_0(\varepsilon)]\} + 1}.$$

5. A method for measuring electrical impedance of a sample using a microwave cavity probe, said microwave cavity probe comprising a resonant microwave cavity having an aperture in an electrically conducting endwall and having a center conducting element comprising a tip that extends through the aperture beyond the endwall, the method comprising:
   positioning said sample outside said microwave cavity and adjacent said tip;
   causing said tip to emit an evanescent electromagnetic field;
   measuring a resonant frequency shift of said probe, wherein said resonant frequency shift results from interaction between said sample and said evanescent electromagnetic field; and
   determining said electrical impedance and the distance between said tip and said sample using the measured resonant frequency shift.

6. A method as recited in claim 5, wherein said probe comprises a scanning evanescent microwave probe having said tip extending from a coaxial or transmission line resonator.

7. A method as recited in claim 5, wherein said measurements of electrical impedance are selected from the group consisting essentially of quantitative and qualitative measurements.

8. A method as recited in claim 5, wherein said electrical impedance comprises complex dielectric constant and conductivity of said sample.

9. A method as recited in claim 5, wherein said sample comprises a material selected from the group consisting essentially of dielectric insulators, semiconductors, metallic conductors and superconductors.

10. A method as recited in claim 5, wherein said sample comprises a multi-layered material.

11. A method as recited in claim 10, wherein said sample comprises a material selected from the group consisting essentially of dielectric insulators, semiconductors, metallic conductors and superconductors.

12. A method as recited in claim 5, wherein said tip-sample interaction is measured with modulation of tip-sample distance.

13. A method as recited in claim 12, further comprising modulating said tip-sample distance with a piezoelectric nano-positioning device.

14. A method as recited in claim 12, further comprising:
    measuring said tip-sample interaction with a lock-in amplifier having an operating frequency coherent with the modulating frequency driving said nano-positioning device.

15. A method as recited in claim 12, further comprising:
    determining a reference zero point of said tip-sample distance by the maximum amplitude of the derivative of resonant frequency or phase of said probe as said tip approaches the sample surface.

16. A method as recited in claim 12, further comprising determining:
    a reference zero point of said tip-sample distance by the curve fitting of the derivative of resonant frequency or phase of said probe with respect to tip-sample distance modulation as said tip approaches the sample surface.

17. A method as recited in claim 5, further comprising:
    determining a physical characteristic of said sample by keeping tip-sample distance constant and calibrating with standard samples.

18. A method as recited in claim 5, further comprising:
    determining a physical characteristic of said sample by keeping resonant frequency constant and calibrating with standard samples.

19. A method as recited in claim 5, further comprising:
    keeping the derivative of resonant frequency with respect to tip-sample distance modulation or external field modulation constant; and
    calibrating with standard samples;
    wherein a physical characteristic of said sample is determined.

20. A method as recited in claim 5, further comprising:
    determining a physical characteristic of said sample by curve fitting of resonant frequency or phase of said probe as said tip approaches said sample.

21. A method as recited in claim 5, further comprising:
    determining a physical characteristic of said sample by curve fitting of derivatives of resonant frequency or phase of said probe with respect to external modulation field as said tip approaches said sample.

22. A method as recited in claim 5, further comprising:
    determining a physical characteristic of said sample by curve fitting or quality factor or amplitude of said probe as said tip approaches said sample.

23. A method as recited in claim 5, further comprising:
    determining a physical characteristic of said sample by curve fitting or derivatives of quality factor or amplitude of said probe with respect to external modulation field as aid tip approaches said sample.

24. A method as recited in claim 17, 18, 19, 20, 21, 22 or 23, further comprising obtaining the nonlinear complex dielectric constant of said sample with electric field modulation.

25. A method as recited in claim 17, 18, 19, 20, 21, 22 or 23, further comprising obtaining a physical characteristic of said sample with magnetic field modulation.

26. A method as recited in claim 17, 18, 19, 20, 22, 21 or 23, further comprising obtaining a physical characteristic of said sample with optical modulation.

27. A method as recited in claim 17, 18, 19, 20, 21, 22 or 23, further comprising obtaining a physical characteristic of said sample with heat modulation.

28. A method as recited in claim 26, further comprising obtaining a physical characteristic of said semiconductor selected from the group consisting essentially of photoconductivity, dopant level, junction depth, junction profile, ion implant flux level, and annealing temperature.

29. The method as recited in claim 5, wherein the measurement is made under quasistatic approximation conditions.

30. A method as recited in claim 5, wherein said tip-sample interaction is measured with a modulated external field applied to a backing of said sample.

31. A method as recited in claim 30, further comprising detecting the derivatives of the resonant frequency or phase, quality factor or amplitude of said probe with respect to modulation of said external field using a lock-in amplifier having an operating frequency coherent with the frequency of the modulation.

32. A method as recited in claim 30, wherein said external field comprises a bias electric field.

33. A method for measuring electrical impedance of a sample using a microwave cavity probe having a tip extending from a microwave cavity, comprising:

positioning said sample outside said microwave cavity and adjacent said tip;

causing said tip to emit an evanescent electromagnetic field;

scanning a surface of said sample with said tip and measuring a resonant frequency shift of said probe, wherein said resonant frequency shift results from interaction between said sample and said evanescent electromagnetic field; wherein said tip-sample interaction is measured with a modulated external field applied to a backing of said sample and determining said electrical impedance and the distance between said tip and said sample using the measured resonant frequency shift.

34. A method as recited in claim 33, further comprising detecting the derivatives of the resonant frequency or phase, quality factor or amplitude of said probe with respect to modulation of said external field using a lock-in amplifier having an operating frequency coherent with the frequency of the modulation.

35. A method as recited in claim 33, wherein said external field comprises a bias electric field.

36. A method as recited in claim 33, wherein said external field comprises a magnetic field.

37. A method as recited in claim 33, wherein said modulated external field comprises optical modulation.

38. A method as recited in claim 37, wherein said optical modulation is achieved by a laser having a characteristic photon energy above the semiconductor sample's carrier excitation energy.

39. A method as recited in claim 37, wherein said optical modulation is achieved by a laser having a characteristic photon energy in infrared region; and wherein said sample is heated by said laser.

* * * * *